United States Patent
Michaeli et al.

(10) Patent No.: US 12,132,586 B2
(45) Date of Patent: Oct. 29, 2024

(54) HIGH BANDWIDTH CAN-DERIVATIVE COMMUNICATION

(71) Applicant: CipherSiP Systems Ltd., Sha'arei Tikva (IL)

(72) Inventors: David Michaeli, Haifa (IL); Yuval Yizhaq Maran, Kibbutz HaMaApil (IL); Ran Sheffi, Pardes Hanna (IL)

(73) Assignee: CipherSiP Systems Ltd., Sha'arei Tikva (IL)

( * ) Notice: Subject to any disclaimer, the term of this patent is extended or adjusted under 35 U.S.C. 154(b) by 0 days.

(21) Appl. No.: 17/760,365

(22) PCT Filed: Feb. 8, 2021

(86) PCT No.: PCT/IL2021/050149
§ 371 (c)(1),
(2) Date: Aug. 9, 2022

(87) PCT Pub. No.: WO2021/161303
PCT Pub. Date: Aug. 19, 2021

(65) Prior Publication Data
US 2023/0060218 A1    Mar. 2, 2023

Related U.S. Application Data

(60) Provisional application No. 62/972,699, filed on Feb. 11, 2020, provisional application No. 62/986,799, filed on Mar. 9, 2020.

(51) Int. Cl.
*H04B 14/04*      (2006.01)
*H04L 12/40*      (2006.01)
*H04L 25/49*      (2006.01)

(52) U.S. Cl.
CPC .... *H04L 12/40065* (2013.01); *H04L 25/4902* (2013.01)

(58) Field of Classification Search
CPC ......... H04L 12/40006; H04L 12/40013; H04L 2012/40215; H04L 12/40; H04B 3/06; G05B 2219/25032; G05B 2219/25331
(Continued)

(56) References Cited

U.S. PATENT DOCUMENTS 9,513,988 B2    12/2016    Hartwich
9,645,958 B2    5/2017     Bosse
(Continued)

FOREIGN PATENT DOCUMENTS

| | | |
|---|---|---|
| EP | 2712123 A1 | 3/2014 |
| EP | 3319274 A1 | 5/2018 |
| WO | 2020021392 A1 | 1/2020 |

OTHER PUBLICATIONS

International Search Report for corresponding application PCT/IL2021/050149 mailed on Apr. 12, 2021.
(Continued)

*Primary Examiner* — Khai Tran
(74) *Attorney, Agent, or Firm* — Heidi Brun Associates Ltd.

(57) ABSTRACT

A communication system for high bandwidth communication over a Controller Area Network (CAN) communication bus. The communication system comprises at least one transmitting node and at least one receiving node. A controller unit of the transmitting node codes and transmits a data field by modulating a sequence of pulses with varying durations defined by deviating a number of level transitions of a known cyclic signal waveform by a series of delays. The series of delays indicates a sequence of data symbols to be transmitted and the series of delays is calculated by applying different modulation calculations for odd and even elements of the data field.

22 Claims, 11 Drawing Sheets

(58) Field of Classification Search
USPC .................................................. 375/242
See application file for complete search history.

(56) References Cited

U.S. PATENT DOCUMENTS

| | | |
|---|---|---|
| 9,690,742 B2 | 6/2017 | Hartwich |
| 9,742,584 B2 | 8/2017 | Hartwich |
| 10,212,002 B2 | 2/2019 | Nickel |
| 10,673,677 B2 | 6/2020 | Wu |
| 10,742,443 B2 | 8/2020 | Beckmann |
| 2007/0147265 A1 | 8/2007 | Eidson |
| 2010/0008456 A1 | 1/2010 | Rohatschek |
| 2014/0244871 A1 | 8/2014 | Hartwich |
| 2014/0328357 A1 | 11/2014 | Fredriksson et al. |
| 2018/0121385 A1* | 5/2018 | Segarra ............... H04L 25/0286 |
| 2020/0065277 A1 | 2/2020 | Poulsen |
| 2020/0104270 A1 | 4/2020 | Poezart |
| 2020/0361441 A1* | 11/2020 | Ruybal ................. B60W 10/08 |
| 2022/0317267 A1* | 10/2022 | Voicu .................... G01S 7/4865 |

OTHER PUBLICATIONS

Shaw, R. "Improving the Reliability and Performance of FlexRay Vehicle Applications Using Simulation Techniques", Waterford institute of Technology, May 27, 2009. (Retrieved on Apr. 7, 2021).
Markus Iversen HUSE, "FlexRay Analysis, Configuration Parameter Estimation, and Adversaries". Norwegian University of Science and Technology, Jun. 4, 2007. (Retrieved on Apr. 4, 2021).
Supplementary Partial European Search Report for corresponding application EP 21754512.8 mailed on Jun. 7, 2023.
Jurgen R. K., "Coming from Detroit: Networks on Wheels", IEEE Spectrum, vol. 23, No. 6, Jun. 1, 1986, pp. 53-59.

* cited by examiner

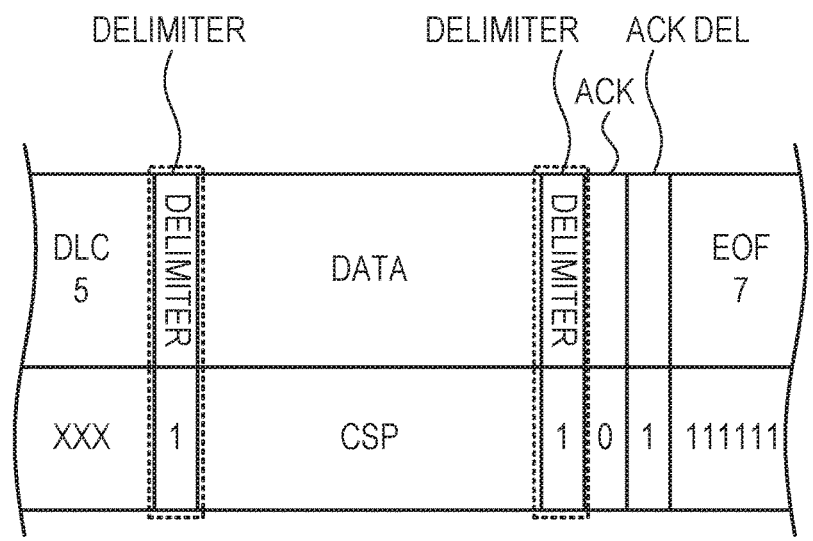
*Figure 6*
*Figure 7*
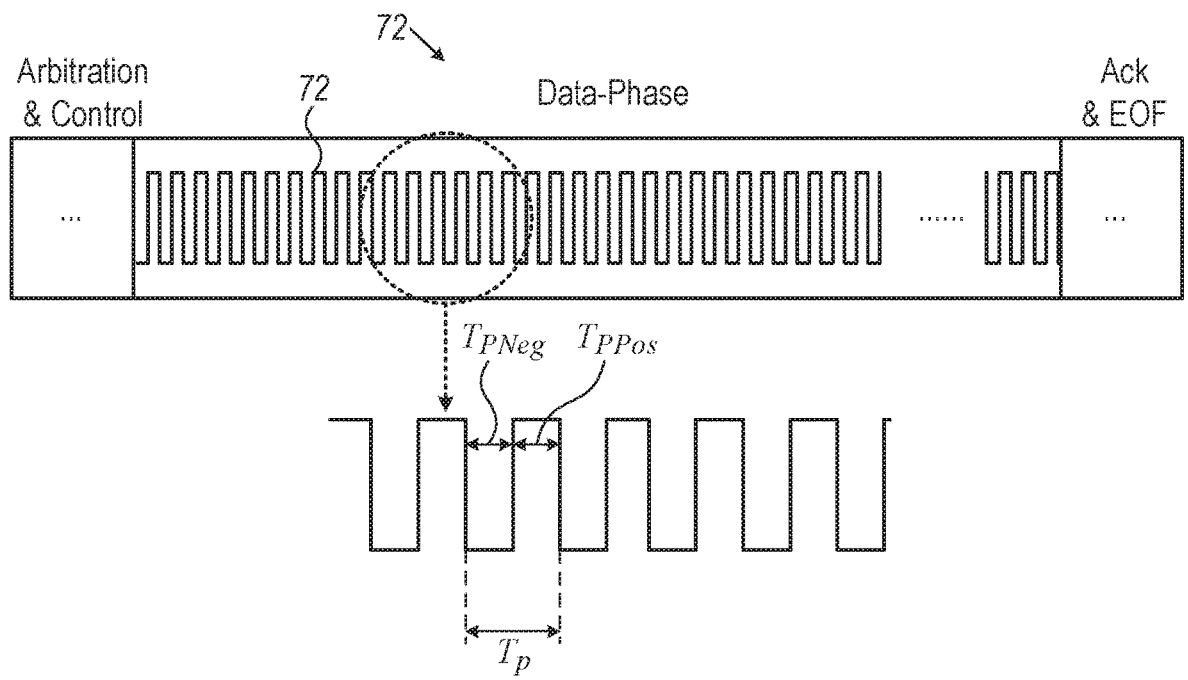
$$T_{PNeg} + T_{PPos} = T_p = \frac{1}{f_{clock}}$$

HIGH BANDWIDTH CAN-DERIVATIVE COMMUNICATION

CROSS REFERENCE TO RELATED APPLICATIONS

This application is a national phase application of PCT application PCT/IL2021/050149 filed Feb. 8, 2021, which claims priority from U.S. provisional patent applications 62/972,699 filed Feb. 11, 2020, and 62/986,799, filed Mar. 9, 2020, all of which are incorporated herein by reference.

FIELD OF THE INVENTION

The present invention relates to Controller Area Network (CAN) communication systems, nodes, controllers, protocols, and methods.

BACKGROUND OF THE INVENTION

Serial communication is used in many fields and for many applications.

A widely used protocol for serial communication is the CAN protocol specified in the BOSCH CAN Specification 2.0 (available at the Robert Bosch GmbH website: http://www.semiconductors.bosch.de) and in the International Standard ISO 11898-1.

CAN delivers a data-rate of up to 1 Mbit/s. Two factors limit the effective data-rate in CAN networks: a first limiting factor is the minimum bit time required for the function of the CAN bus arbitration method. The second limiting factor is the relation between the numbers of data bits and frame bits in a CAN message.

"CAN with Flexible Data-Rate" or CAN-FD protocol is an extension of the CAN protocol. The CAN-FD protocol was released in 2012 by BOSCH (available at the Robert Bosch GmbH website: http://www.semiconductors.bosch.de). CAN-FD uses the CAN bus arbitration method and increases effective bit-rate. The CAN-FD effective data-rate is increased—up to 5 Mbit/s, and allowing more extended data fields. The CAN protocol uses four bits as the Data Length Code resulting in 16 different codes. Only the first nine values are used—codes [0-8], standing for data field length of [0-8] bytes. In CAN, the codes [9-15] are defined to signify eight data bytes. In CAN-FD, the codes [9-15] are used to indicate more extended data fields.

Following CAN and CAN-FD protocols, a mixed communication system can employ CAN nodes and CAN-FD nodes. Nodes in the network must have a CAN-FD protocol controller for CAN-FD communication, and all CAN-FD protocol controllers are also able to communicate in CAN communication.

CAN-XL is another extension of CAN, aimed at delivering an increased data-rate of up to 10 Mbit/s. Publications on the CAN XL specification are available by the CAN in Automation (CIA) nonprofit association. ISO standardization proceedings of CAN-XL are expected.

CAN XL is scalable regarding payload length (1 to 2048 byte) and bit-rate (below 1 Mbit/s to 10+ Mbit/s). The large data fields of CAN XL enable higher layer protocols like IP (Internet Protocol). To operate at its maximal data-rate, CAN-XL requires a different type of bus transceiver with two electrical modes—recessive/dominant, like in CAN and CAN-FD, and push-pull signalling method.

In addition to the CAN and CAN-FD standard protocols and the CAN-XL, additional CAN-derivative protocols are known, including, for example, CAN 2.0A, CAN 2.0B, ISO 11898-1/2/3, CAN-FD, ISO-CAN-FD, CAN-HG, J1939, CANOpen, CANOpen FD, DeviceNet, ARINC825 and others.

CAN-derivative communication networks are prone to communication congestions caused due to (1) bus topology, length and media properties, (2) CAN-derivative protocol structure constraints, (3) physical layer integrated circuit limitations, (4) interferences, and (5) systems' clocks limitations and mismatch, and other reasons.

Proper operation of CAN-derivative communication systems is commonly achieved by adaptation of CAN data-phase baud-rate to a limit in which zero-errors are detected on the bus. In practical applications, the busses are designed with high margins in terms of (1) maximal allowable possible baud-rate, (2) bus topology, (3) components ratings and specs, and other properties. Baud-rate, topology and component property large margins lead to high-costs in engineering and production, large amounts of wiring and interconnections and low effective data-rates. As a result, the full potential of the physical layer, the wiring, the environment, and transceivers, is not exploited in an optimal manner.

CAN-derivative communication is widely used in electronic systems in fields such as vehicles, robotics, defense, industrial automation, underwater vehicles, medical equipment, avionics, and other industries.

The following publications describe CAN and CAN-derivative communication systems, protocols and methods: U.S. Pat. Nos. 9,742,584; 9,645,958; 9,513,988; 9,690,742; 10,212,002; 10,742,443; 10,673,677 and US Patent Applications Nos. 2020/0104270, now issued as U.S. Pat. No. 11,275,704; and 2020/0065277, now issued as U.S. Pat. No. 11,294,837.

A common use of CAN-derivative communication is for broadcasting sensor data and control information on wire interconnections between different parts of the electronic instrumentation and control system. In modern high-performance systems, there is a growing need for serial communication networks with higher bandwidth.

SUMMARY OF THE INVENTION

According to a first aspect of the invention, there is provided a communication system for coding and communicating data frames for high bandwidth communication over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and a controller unit of the transmitting node is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

There is provided a controller unit for coding and communicating data frames for high bandwidth communication over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the controller unit is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

The controller unit of the receiving node is to measure a received sequence of pulses durations, estimate therefrom the series of delays and determine the sequence of data symbols.

The controller unit of the receiving node is further to measure the received sequence of pulses durations by measuring durations between consecutive, same-type level-transitions.

The series of delays may further depend on a delay unit granularity factor G and a length of a data symbol $L_{sym}$ in bits. The delay unit granularity factor G and a length of a data symbol in bits $L_{sym}$ are selected to optimize data rate, bit error rate, or maximal data rate under acceptable bit error rate.

In response to link quality indication, the controller unit may recalculate the series of delays with different values of at least one of the delay unit granularity G factor and the length of a data symbol in bits $L_{sym}$.

The data frame may comprise one or more pre-defined reserved bits used for protocol type selection and the controller unit facilitates communication over the CAN communication bus in more than a single protocol.

The number of level transitions in the Data Field may be determined as a function of DLC data length code and is optionally extended to constitute one or more information fields from a group consisting of: the sequence of data symbols to be transmitted; CRC length; contextual metadata for protocol control; calibration pilot level-transitions; and forward error correction codes.

The controller unit of the transmitting node may transmit pilot signals containing calibration information and the controller unit of the receiving node is to calibrate measurement clock based on the calibration information.

The controller unit of the transmitting node may scramble the symbols to be transmitted and the controller unit of the receiving node may descramble the symbols.

There is provided a method for coding and communicating data frames for high bandwidth communication over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and at least one controller unit of the transmitting node and at least one controller unit of the receiving node, the method comprising coding and transmitting the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

The series of delays may depends on a delay unit granularity factor G and a length of a data symbol $L_{sym}$ in bits and wherein the delay unit granularity factor G and a length of a data symbol in bits $L_{sym}$ are selected to optimize data rate, bit error rate, or maximal data rate under acceptable bit error rate.

The method may further comprise, in response to link quality indication, recalculating the series of delays with different values of at least one of the delay unit granularity G factor and the length of a data symbol in bits $L_{sym}$.

The data frame may comprise one or more pre-defined reserved bits used for protocol type selection and the method further comprises facilitating communication over the CAN communication bus in more than a single protocol.

The number of level transitions in the Data Field may be determined as a function of DLC data length code and is optionally extended to constitute one or more information fields from a group consisting of: the sequence of data symbols to be transmitted; CRC length; contextual metadata for protocol control; calibration pilot level-transitions; and forward error correction codes.

The method may further comprise measuring a received sequence of pulses durations, estimating therefrom the series of delays and determining the sequence of data symbols.

The method may further comprise measuring the received sequence of pulses durations by measuring durations between consecutive, same-type level-transitions.

The method may further comprise transmitting pilot signals containing calibration information and calibrating measurement clock based on the calibration information.

The method may further comprise scrambling and descrambling the symbols.

According to a second aspect of the invention, there is provided a communication system for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN), wherein for a controller unit and a plurality of associated data-generating nodes, one of the controller unit and a predetermined DGN is to: request the plurality of associated DGN to provide DGN data; and control the transmission of the DGN data over the CAN bus by transmitting a spacing interval between the multiple data-segments; and wherein the controller unit is to arrange portions of the DGN data received from the plurality of DGN as sequential segments of the Data Field of the data frame.

There is provided a controller unit for processing multiple data segments to be exchanged as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the controller unit is to communicate over a bus with a plurality of associated data-generating node (DGN); request the plurality of associated DGN to provide DGN data; control the transmission of the DGN data over the CAN bus by transmitting a spacing interval between the plurality of data-segments; arrange portions of the DGN data received from the plurality of DGN as sequential segments of the Data Field of the data frame.

The controller unit is further to communicate the data frame to one or more communication nodes over the CAN communication bus.

The one or more of the DGNs are from a group consisting of: an audio sensor, an Active Noise Cancellation (ANC) sensor, ultrasonic sensor, radar sensor, navigation sensor, localization sensor, battery gauge, lighting indicator, RPM indicator, wheel speed indicator, liquid level indicator, battery voltage indicator, tension sensor, temperature sensor, pressure sensor, driver and passenger heart rate sensor, driver and passenger breathing sensor, driver and passenger ECG sensor, EPIC sensor.

A communication session of the data frame may be open for a period of time that complies with a frame structure of a group consisting of CAN protocol, CAN-based protocol, CAN-FD, CAN-FD-based protocols, CAN-XL protocol, and ethernet. The communication session of the data frame may be terminated at least by one of (1) the controller unit; (2) one or more of the DGN; and (3) is terminated by a timeout mechanism.

According to an embodiment of the invention, the controller unit is further to selectively exchange multiple data segments as a single data frame under a predefined communication session plan.

According to an embodiment of the invention, the one of the controller unit and a predetermined DGN is further to signal the DGN to transmit a specific type of information.

The spacing intervals may be implemented by transmitting edge spacing modulated symbols within the Data Field.

The spacing interval may have a duration TISS calculated based on at least (1) a length of the CAN communication bus, (2) a propagation velocity of signals in the CAN communication bus, (3) a maximal propagation velocity of signals in the DGN and the controller unit, and (4) the CAN communication bus bit timing parameters.

During the spacing intervals, the CAN communication bus may remain in a recessive state.

According to an embodiment of the invention, after the spacing interval, if the CAN communication bus remains in the recessive state for a skip duration, the one of the controller unit and a predetermined DGN is further to skip the transmission of a corresponding DGN data.

According to an embodiment of the invention, after the spacing interval, if the CAN communication bus remains in the recessive state for a reintegration duration, the one of the controller unit and a predetermined DGN is further to close the data transmission.

The DGN data may be composed of one or more data items from a group consisting of (1) DGN identifier, (2) DGN status, (3) data type, and (4) payload, and (5) a check field.

The DGNs may transmit the DGN data as one of a group consisting of open collector signal, push-pull signal, mixed pull-push and open collector signal, designed to maintain the communication bus in recessive state during the spacing intervals.

According to an embodiment of the invention, the predetermined DGN is to transmit over the CAN communication bus a Remote Frame addressing the plurality of associated DGN and the plurality of associated DGN are to respond by transmitting DGN data.

According to an embodiment of the invention, the controller unit is to communicate over the CAN communication bus with the plurality of associated data-generating node (DGN); request the plurality of associated DGN to provide DGN data; control the transmission of the DGN data over the CAN bus by transmitting a spacing interval between the plurality of data-segments in the Data Field; and arrange portions of the DGN data received from the plurality of DGN as sequential segments of the Data Field of the data frame.

According to an embodiment of the invention, the controller unit is further to set one or more predefined identifying values of a specific bit within the Control Field of the data frame to enable communicating data frames having a logical structure according to one or more protocols from a group consisting of: CAN-FD standard, CAN-XL, CAN 2.0A, CAN 2.0B, CAN ISO 11898-2, CAN ISO 11898-3, ISO-CAN-FD, CAN-HG, J1939, CANOpen, CANOpen FD, DeviceNet, and ARINC825.

There is provided a method for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN), wherein for a controller unit and a plurality of associated data-generating nodes, the method comprising: requesting the plurality of associated DGN to provide DGN data; and controlling the transmission of the DGN data over the CAN bus by transmitting a spacing interval between the multiple data-segments; and arranging portions of the DGN data received from the plurality of DGN as sequential segments of the Data Field of the data frame.

The method may further comprise communicating the data frame to one or more communication nodes over the CAN communication bus.

One or more of the DGNs are from a group consisting of: an audio sensor, an Active Noise Cancellation (ANC) sensor, ultrasonic sensor, radar sensor, navigation sensor, localization sensor, battery gauge, lighting indicator, RPM indicator, wheel speed indicator, liquid level indicator, battery voltage indicator, tension sensor, temperature sensor, pressure sensor, driver and passenger heart rate sensor, driver and passenger breathing sensor, driver and passenger ECG sensor, EPIC sensor.

The method may further comprise opening a communication session of the data frame for a period of time that complies with a frame structure of a group consisting of CAN protocol, CAN-based protocol, CAN-FD, CAN-FD-based protocols, CAN-XL protocol, and ethernet.

The method may further comprise terminating a communication session of the data frame at least by one of (1) the controller unit; (2) one or more of the DGN; and (3) is terminated by a timeout mechanism.

The method may further comprise selectively exchanging multiple data segments as a single data frame under a predefined communication session plan.

The method may further comprise signaling the DGN to transmit a specific type of information.

The spacing intervals may be implemented by transmitting edge spacing modulated symbols within the Data Field.

The spacing interval may have a duration TISS calculated based on at least (1) a length of the CAN communication bus, (2) a propagation velocity of signals in the CAN communication bus, (3) a maximal propagation velocity of signals in the DGN and the controller unit, and (4) the CAN communication bus bit timing parameters.

According to an embodiment of the invention, during the spacing intervals, the CAN communication bus remains in a recessive state.

According to an embodiment of the invention, the method further comprises, after the spacing interval, if the CAN communication bus remains in the recessive state for a skip duration, skipping the transmission of a corresponding DGN data.

According to an embodiment of the invention, the method further comprises, after the spacing interval, if the CAN communication bus remains in the recessive state for a reintegration duration, closing the data transmission.

The DGN data may be composed of one or more data items from a group consisting of (1) DGN identifier, (2) DGN status, (3) data type, and (4) payload, and (5) a check field.

According to an embodiment of the invention, the DGNs are to transmit the DGN data as one of a group consisting of open collector signal; push-pull signal; mixed pull-push and open collector signal, designed to maintain the communication bus in recessive state during the spacing intervals.

The method may comprise transmitting over the CAN communication bus, by the predetermined DGN, a Remote Frame addressing the plurality of associated DGN and responding, by the plurality of associated DGN, by transmitting DGN data.

The method may further comprise, by the controller unit, communicating over the CAN communication bus with the plurality of associated data-generating node (DGN); requesting the plurality of associated DGN to provide DGN data; controlling the transmission of the DGN data over the CAN bus by transmitting a spacing interval between the plurality of data-segments in the Data Field; and arranging portions of the DGN data received from the plurality of DGN as sequential segments of the Data Field of the data frame.

The method may comprise setting one or more predefined identifying values of a specific bit within the Control Field of the data frame to enable communicating data frames having a logical structure according to one or more protocols from a group consisting of: CAN-FD standard, CAN-XL, CAN 2.0A, CAN 2.0B, CAN ISO 11898-2, CAN ISO 11898-3, ISO-CAN-FD, CAN-HG, J1939, CANOpen, CANOpen FD, DeviceNet, and ARINC825.

According to another aspect of the invention, there is provided a data-generating node for processing multiple data segments to be exchanged as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the controller unit is to: communicate over a bus with at least one controller unit and a plurality of associated data-generating node (DGN); request the plurality of associated DGN to provide DGN data; control the transmission of the DGN data over the CAN bus by transmitting a spacing interval between the plurality of data-segments; and arrange portions of the DGN data received from the plurality of DGN as sequential segments of the Data Field of the data frame.

According to yet another aspect of the invention, there is provided a communication system for high bandwidth communication over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and a controller unit of the transmitting node is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements, and wherein, for the controller unit of the transmitting node and a plurality of associated data-generating nodes, one of the controller unit and a predetermined DGN is to request the plurality of associated DGN to provide DGN data; and control the transmission of the DGN data over the CAN bus by transmitting a spacing interval between the multiple data-segments; and wherein the controller unit is to arrange portions of the DGN data received from the plurality of DGN as sequential segments of the Data Field of the data frame.

According to a further aspect of the invention, there is provided a communication system for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN), wherein for a controller unit and a plurality of associated data-generating nodes, one of the controller unit and a predetermined DGN is to request the plurality of associated DGN to provide DGN data; and control the transmission of the DGN data over the CAN bus by transmitting a spacing interval between the multiple data-segments; wherein the one of the controller unit and a predetermined DGN is to arrange portions of the DGN data received from the plurality of DGN as sequential segments of the Data Field of the data frame, and wherein one of the controller unit and a predetermined DGN is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

BRIEF DESCRIPTION OF THE DRAWINGS

For a better understanding of the invention concerning the embodiments thereof, reference is made to the accompanying drawings, in which like numerals designate corresponding entities throughout, and in which:

FIG. 6 further illustrates an exemplary CAN-derivative frame modified in accordance with embodiments of the invention;

FIG. 7 shows an example frame and a non-modulated data-phase signal;

DETAILED DESCRIPTION OF EMBODIMENTS

Figure 1A:
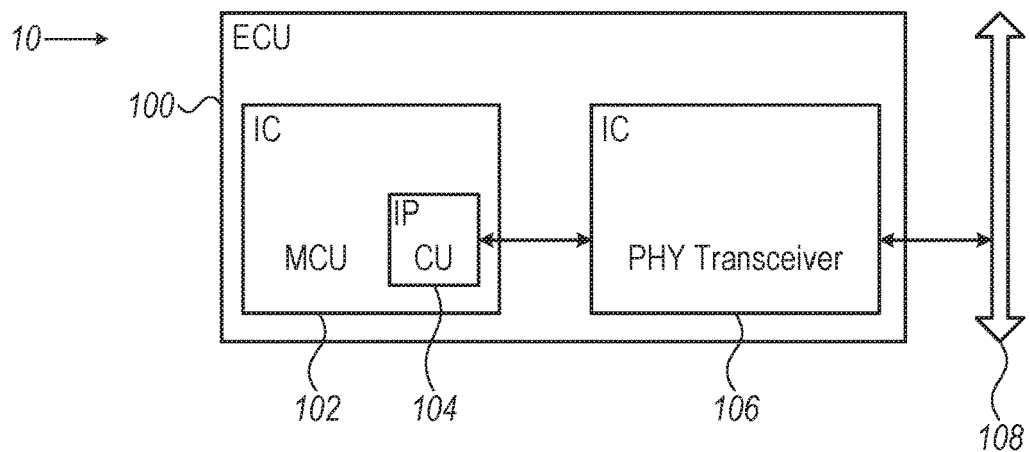
FIGS. 1a-1c are block diagrams that schematically illustrate communication nodes in accordance with embodiments of the present invention.

Embodiments of the present invention provide systems and methods that can be implemented in Controller Area Network (CAN) communication systems, nodes, controllers, protocols, and methods. The systems and methods according to embodiments of the invention may replace existing CAN communication systems, nodes, controllers, protocols, and methods—or co-exist with them.

The term 'CAN-derivative' will be used herein to describe CAN communication systems, nodes, controllers, protocols, and methods set according to CAN and CAN-FD standard protocols, CAN-XL and other CAN-based protocols. Examples to other CAN-based protocols are CAN 2.0A, CAN 2.0B, ISO 11898-1/2/3, ISO-CAN-FD, CAN-HG, J1939, CANOpen, CANOpen-FD, DeviceNet, ARINC825, the protocol describes at PCT Application Publication No. WO2020021392, which is incorporated herein by reference, and others.

To comply with the relevant CAN-derivative protocols and co-exist with them on the same communication bus, the message frame structure according to embodiments of the invention is based on the logic structure of the CAN-derivative protocols. Specifically, the bit-sequence and state-machine described in the CAN-derivative protocol standards are used:

A Start-of-Frame (SOF) bit;
an Arbitration Field—either the standard 11-bit or the extended 29-bit. The Arbitration Field may be used in the manner described in the CAN and CAN-FD protocol standards.
a Control Field;
a Data Field (also referred to as data phase);
a CRC Field;
an Acknowledge Field; and
an End-Of-Frame Field.

The Arbitration Field and the sequential bits of the such as the FDF, RTR, R0, R1 may remain as described the relevant CAN-derivative protocol.

The acknowledgement and end-of-frame (a.k.a. EOF) sequences may remain unchanged as well, as described in the relevant CAN-derivative protocol.

The DLC (data length control) field may remain either unchanged or partly changed to have a better granularity in data-phase length definition. For example, the DLC logical structure can be modified by modifying a specific reserved bit within the control field, to notify the frame receiver nodes about a new type of protocol frame. While this modification is possible and may introduce high levels of flexibility, such frames shall not anymore comply with the CAN-FD basic frame structure and it will not be readable by CAN-FD-only protocol controllers.

The communication system 20 may be formed as a mixed communication system, facilitating communication-based on the CAN protocol, the CAN-FD protocol, other CAN-derivative protocols, together with the novel communication protocol according to embodiments of the invention.

According to an aspect of the invention, the communication system, protocols, controller units and methods are to facilitate a data-phase protocol coding and decoding for high-bandwidth communication.

According to another aspect of the invention, the communication system, protocols, controller units and methods are to facilitate the exchange of multiple data segments as a single data frame.

Figure 1B:
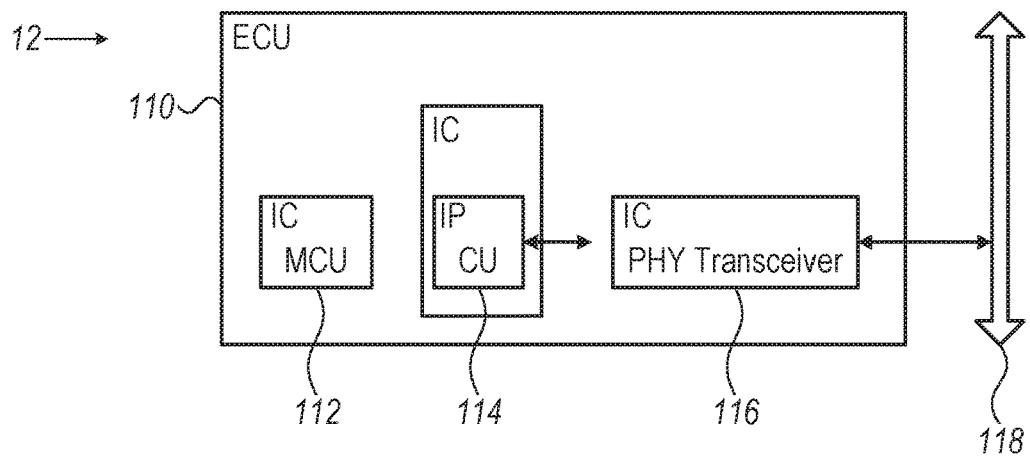
Figure 1C:
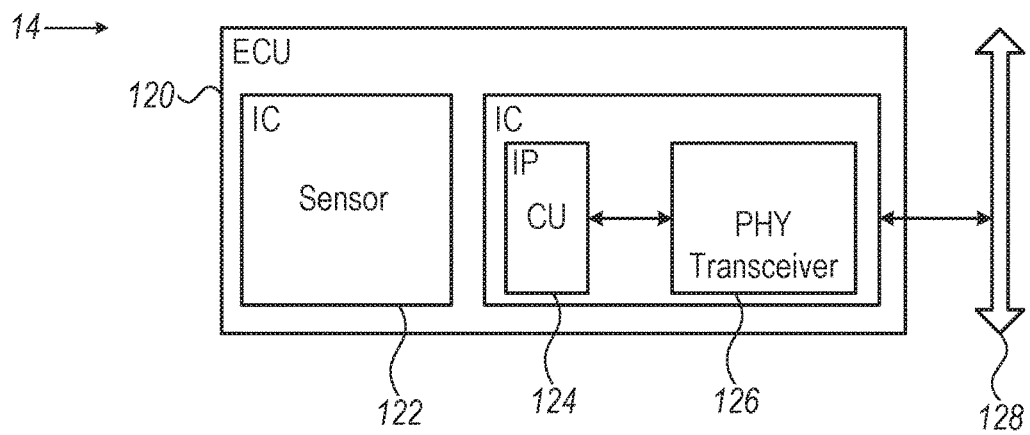

Various embodiments of the invention may be realized as a controller unit, as illustrated in FIGS. 1a-1c. The structure of systems incorporating the controller unit is described with reference to levels of functionality—ECU, IC and IP. For ease of explanation, the invention will be described herein mainly with reference to the functional aspects of the IP core level.

'ECU' stands for Electronic Control Unit (also called ECM—electronic control module). The term ECU designates an embedded system implemention—a combination of a computer processor, computer memory, and input/output peripheral devices that has a dedicated function within a larger mechanical or electrical system. ECUs are often based on microprocessors. ECUs are embedded as part of a complete device often including electrical or electronic hardware and mechanical parts, and control various operational aspects.

The term IC stands for Integrated Circuit. The term IC as used herein designates the functional elements of the ECU that is realized as an IC component.

The term IP stands for a semiconductor intellectual property core (also called IP core, or IP block). The IP core is a reusable unit of logic, cell, or IC layout design that is responsible for the functional aspects of the ECU's operation.

FIG. 1a schematically illustrates a communication node 10 for example of the kind used in the automobile industry. The communication node 10 is formed as an ECU 100, comprising microcontroller unit (MCU) 102. The usage of the term MCU should not restrict the other processing unit possibilities such as MPU (micro-processor unit), FPGA, SoC, SiP (system in a package) etc., all of which serve as processing units enhanced with variety of communication technologies. Controller unit 104 according to embodiments of the invention is implemented as part of MCU 102. The MCU 102 is connected to a physical layer interface PHY 106 to transmit data when acting as transmitting node and/or receive data when acting as a receiving node, communicating over bus 108.

For ease of explanation, other structural components and functional elements of the communication node 10 are not shown.

According to the embodiment of FIG. 1*b*, the Control Unit CU 114 is realized as a separate module. CU 114 is coupled to MCU 112 and PHY 116. The configuration of FIG. 1*b* may, for example, serve a scenario of equipping existing ECUs with the novel capabilities provided by the present invention.

In the configuration illustrated in FIG. 1*c*, the communication node 124 is composed of analog sensor 122. The CU 124 and the physical layer interface PHY 126 are formed together.

According to other embodiments of the invention (not shown), the communication node may be integrated inside a PHY transceiver unit or be used as a separate functional device (such as an ASIC, FPGA, MCU etc.) that be accessed using various interfaces such as SPI, QSPI, I2C, I2S, or standard Ethernet Media-Independent-Interface, such as, RMII, MII, RGMII, and more.

A controller unit according to certain embodiments may be assimilated together with a CAN and/or CAN-FD protocol controllers in a single integrated circuit. According to other embodiments, the controller unit may be implemented as a separate integrated circuit that may be coupled to a CAN and/or CAN-FD protocol controllers arranged in a different integrated circuit. In these embodiments, a single communication node capable of multi-protocol communication (mixed communication system) is provided.

According to yet other embodiments, the controller unit may be implemented as a dedicated communication node capable of a single-protocol communication only.

Figure 2A:
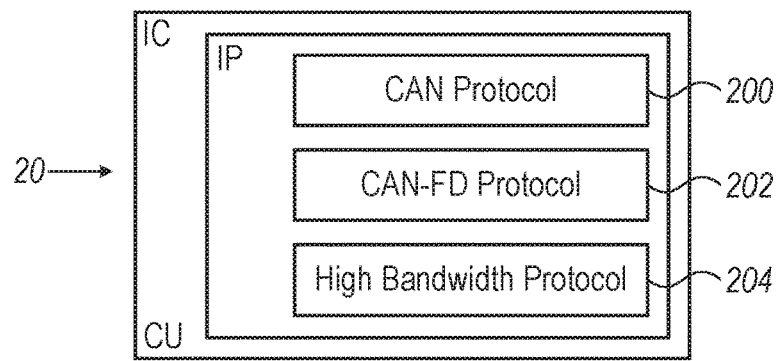
FIGS. 2a-2c are block diagrams that schematically illustrate possible options for realizing mixed-protocol communication according to embodiments of the invention.
Figure 2B:
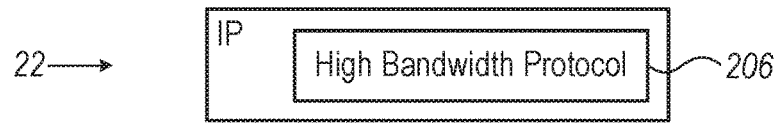
Figure 2C:
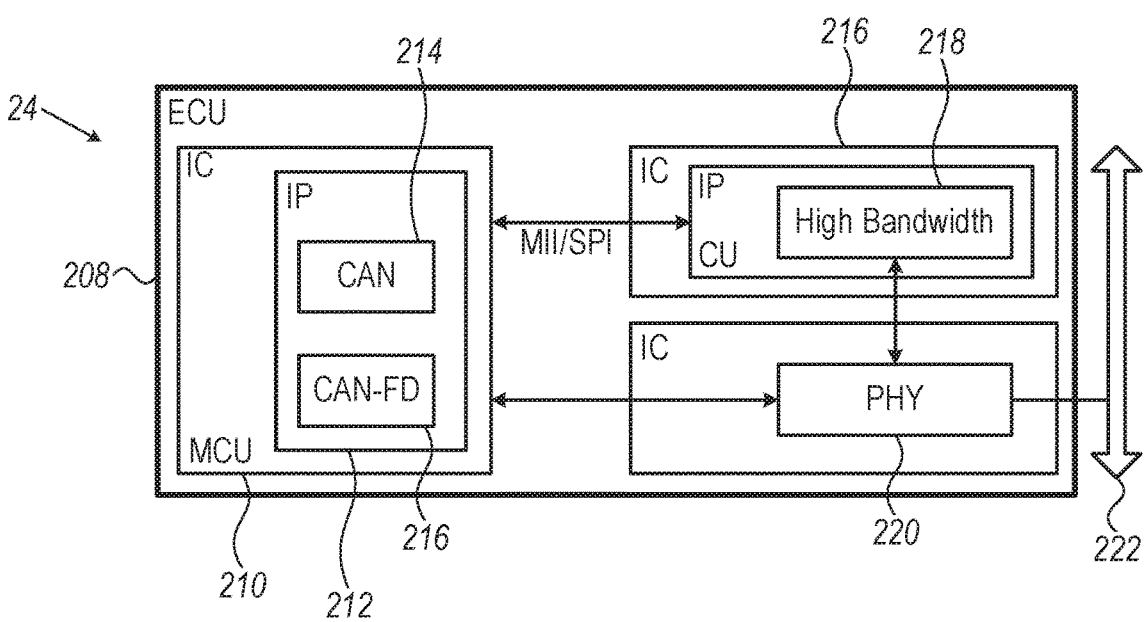

FIGS. 2*a*-2*c* schematically illustrate possible options for realizing mixed-protocol communication according to embodiments of the invention.

FIG. 2*a* illustrate, in a single integrated circuit, a controller unit 20 with functional elements 200, 202 and 204 capable of communicating in CAN protocol, CAN-FD protocol and the novel high-bandwidth protocol according to embodiments of the invention.

Controller units 20 and 22 of FIGS. 2*a*-2*b* may be assimilated in communication nodes of any of the configurations depicted in FIGS. 1*a*-1*c*. For example, if controller unit 20 of FIG. 2*a* is assimilated in the communication node 14 of FIG. 1*c*, a single communication node is thus capable of multi-protocol communication, should the communication system is configured as a mixed communication system.

By another example, if controller unit 22 of FIG. 2*b* is assimilated in the communication node 12 of FIG. 1*b*, data from the MCU 112 may be communicated over bus 118 in the novel high-bandwidth protocol. Should MCU 112 be equipped with elements capable of communicating in CAN and CAN-FD protocols (not shown)—communication in these protocols is enabled.

Mixed communication may be achieved in other configurations, for example, a controller unit capable of high-bandwidth communication may be implemented as a separate integrated circuit coupled to a CAN and/or CAN-FD protocol controllers arranged in a different integrated circuit.

Figure 3A:
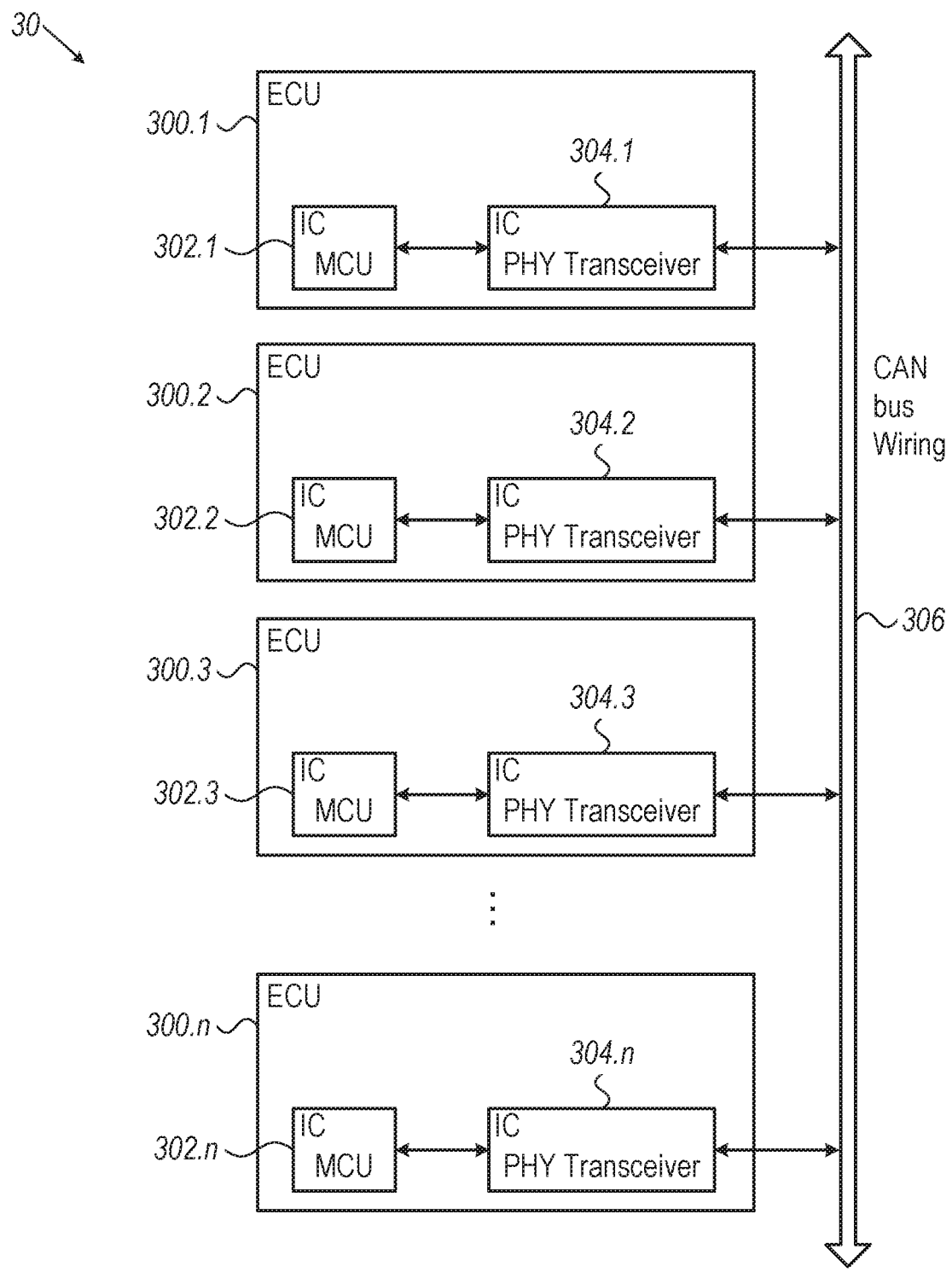
FIGS. 3a-3b are functional connection diagrams illustrating CAN-derivative bus networks in accordance with embodiments of the present invention.

FIG. 3*a* is a functional connection diagram of a CAN-derivative bus network 30 that can accommodate high-bandwidth communication including mixed communication according to embodiments of the invention. The network 30 is arranged in a linear connection topology and is composed of communication node 300.1-300.*n*. Communication nodes 300.1-300.*n* may be construed as communication node 10 of FIG. 1*a*, comprising MCUs 302.1-302.*n* and PHYs 304.1-304.*n* connected to CAN bus wiring 306. Each communication nodes 260.1-260.*n* connects all other communication nodes through the common bus wiring 280. A linear connection topology is typically preferred for best communication performance and low level of interferences. Nevertheless, for optimized wiring and cost, other topologies may be used, including topologies that degrade signal integrity and reliability.

Figure 3B:
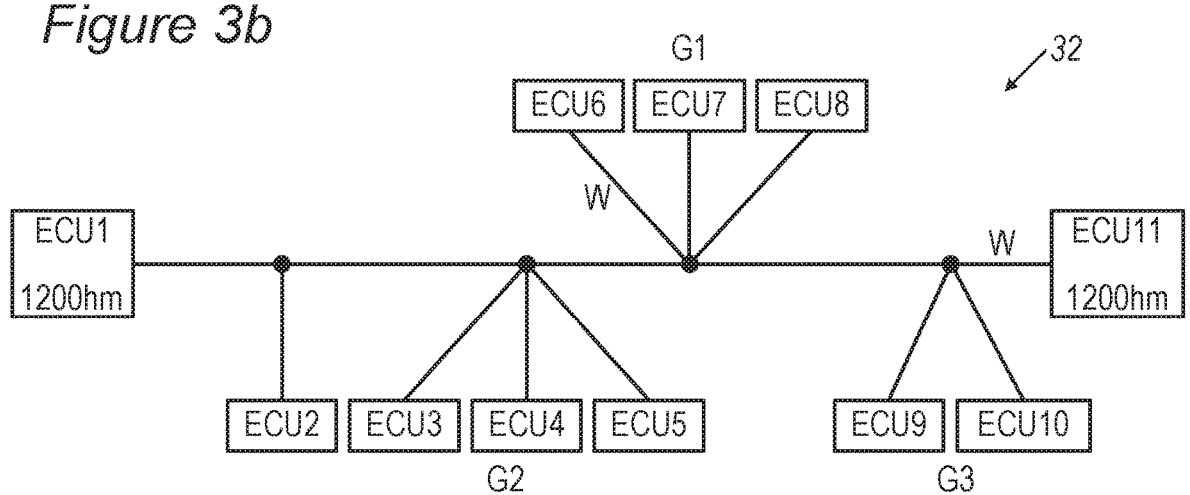

FIG. 3*b* is a functional connection diagram of another CAN-derivative bus network 32 that can accommodate high-bandwidth communication including mixed communication according to embodiments of the invention. The communication nodes are designated as ECU1-ECU11. Each of communication nodes ECU1-ECU11 may be construed as communication nodes 10, 12, 14 of FIGS. 1*a*-*ac*.

The topology of network 32 is common, for example, in vehicular communication. In the topology of network 32, multiple groups G1-G3 of communication nodes passive-stars are interconnected by long wires W. This type of topology has many advantages in production cost, wiring total length, weight and other factors. However, such topologies have signal-related disadvantages due to the impedance mismatches caused by the splits, long stubs, and signal integrity issues in CAN-derivative architectures.

Communication nodes 300.1-300.*n* may be arranged by a combinations of configurations depicted in FIGS. 1*a*-1*c* and 2*a*-2*c*, and many more.

For ease of explanation, communication nodes 300.1-300.*n* are depicted in FIGS. 3*a*-3*b* as identical, but this is not necessarily so.

The invention is not limited by the design and configuration of the communication nodes, as well as by the design and topology of the communication network. Many variations, options, modifications and alterations can be made without departing from the scope or spirit of the invention.

Data-Phase Protocol Coding for High Bandwidth Communication

According to a first aspect of the invention, there are provided methods and systems for high bandwidth communication, achieved by coding the data field in CAN frame. The data field of the CAN frame is coded as a sequence of pulses with varying durations. The durations are the result of deviating a known cyclic signal waveform's level transition points by a series of delays $\{d_0, d_1, d_2, \ldots, d_{N-1}\}$. These delays are defined and calculated according to a sequence of data symbols $\{s_0, s_1, \ldots, s_{N-1}\}$ to be transmitted.

The transmitter side transmits the modulated signal. The receiver side measures the received sequence of durations, estimates the original known cyclic waveform of level-transitions, and determines the corresponding sequence of symbols that was transmitted by the transmitter.

The series of delays $\{d_0, d_1, d_2, \ldots, d_{N-1}\}$ is calculated by applying different modulation calculations for odd and even elements. The application of different modulation calculations for odd and even elements is aimed at addressing the inherent asymmetry that characterized the non-return-to-zero (NRZ) and CAN physical layer limitations in practical networks.

In CAN and CAN-FD protocols, the information is coded as a non-return-to-zero (NRZ) signal. The information is sampled by the receivers at pre-defined sampling points (1 sampling point or 3 sampling points). Due to these restrictions, and the physical layer potential limitations, the maximal possible baud-rate to be used in a typical channel is bounded well below the potential physical layer capacity.

One of the most prominent interferences caused in topologies such as the topology of network 30 illustrated in FIG. 3b happens during the transitions of the bus driver from the dominant state to recessive state. During the recessive state the transmitting node's PHY transceiver doesn't drive the bus and is switched to a high impedance output. As a result, substantial ripples and ringing are introduced, degrading the receivers' ability to sample the transmitted data. Even when using specially constructed CAN-derivatives transceivers (a.k.a. CAN-FD-SIC), the maximal effective data-rate is bounded due to protocol controller technical constraints such as sample-point, clock drift, accuracy and more. In addition, the bit asymmetry phenomenon remains a major drawback for all such transceivers, as a result of the difference between the output impedance of the transceiver during the '0' and '1' bit transmissions.

In many practical networks and network topologies, the high impedance output phenomenon causes transmission errors, logical bit asymmetry and high error rates. Current possible solutions minimize the ringing, but struggle with the eventual bit driving asymmetry.

Figure 4A:
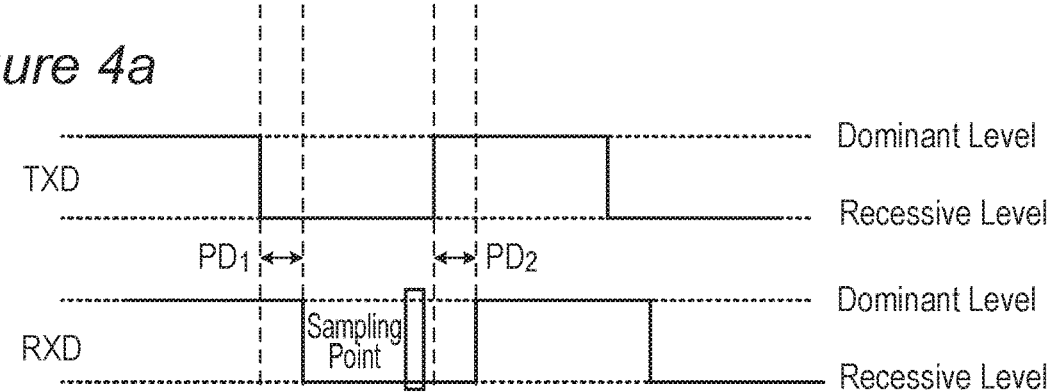
FIGS. 4a-4b are transmission diagrams that schematically illustrate the communication in the CAN-derivative bus network shown in FIG. 3b.
Figure 4B:
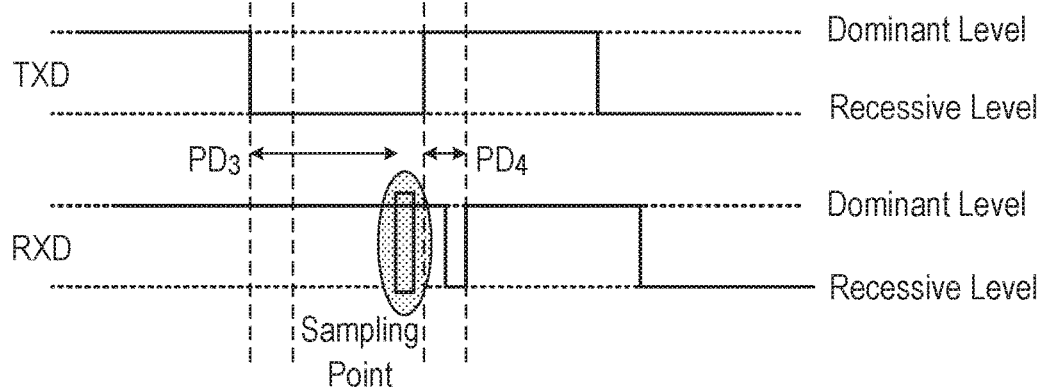

FIGS. 4a-4b schematically illustrate transmission diagrams of the communication in the topology illustrated in FIG. 3b. The transmitted signal TXD and the received signal are shown in their dominant and recessive levels. In combination, FIGS. 4a-4b exemplify CAN-derivative bit driving asymmetry.

In FIG. 4a, a perfectly symmetric transitions are shown, and the sampling point samples the RXD signal in a safe location for which, the probability of bit switching error due to physical phenomena such as clock drift and jitter, ringing and others, is negligible. The propagation delay $PD_1$ between the falling edges TXD Edge 1 and RXD Edge 1 is like the propagation delay $PD_2$ between the rising edges TXD Edge 2 and RXD Edge 2.

In FIG. 4b, a practical asymmetry is shown, for example as expected in network topologies of the type illustrated in FIG. 3b. In this case, the propagation delay $PD_3$ between the falling edges TXD Edge 1 and RXD Edge 1 is significantly larger that the propagation delay $PD_4$ between the rising edges TXD Edge 2 and RXD Edge 2. As a result, the sampling point may sample a wrong bus level. Consequently, the whole message shall be retransmitted.

Figure 5A:
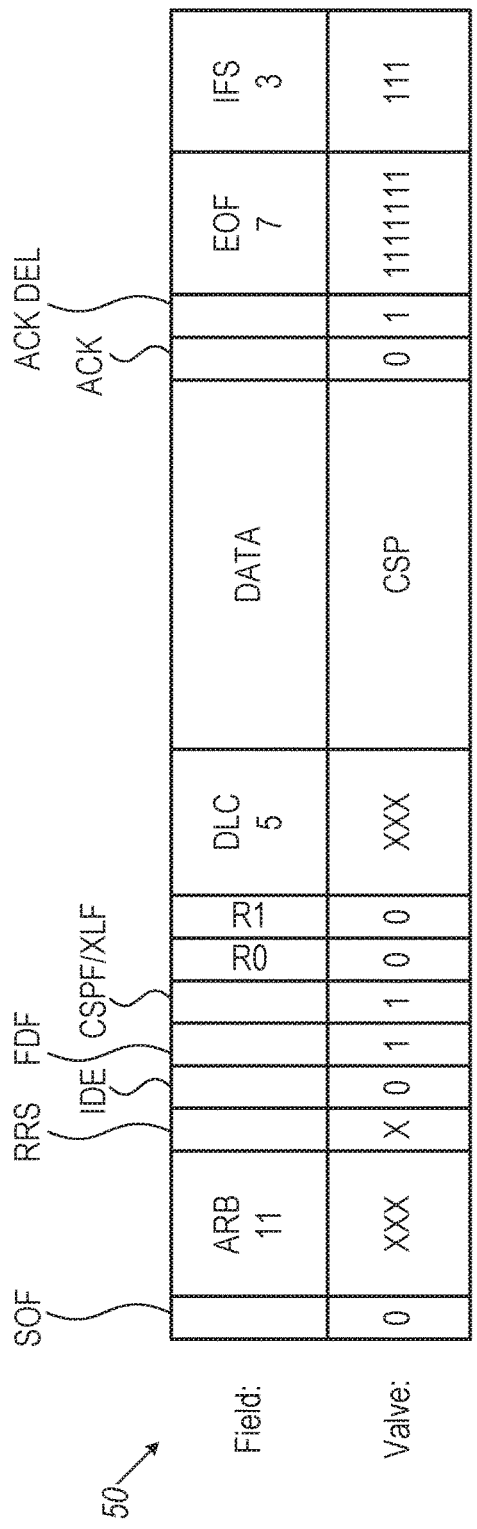
FIGS. 5a-5b show exemplary CAN-derivative frames modified in accordance with embodiments of the invention.
Figure 5B:
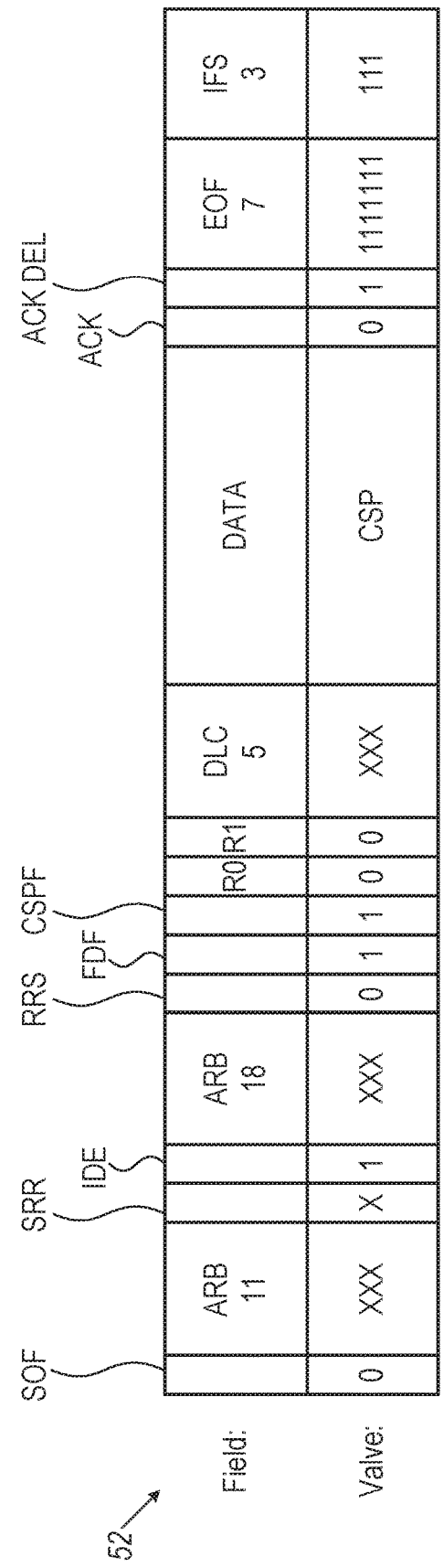

FIGS. 5a-5b show exemplary CAN-derivative frames 50, 52 modified in accordance with embodiments of the invention. The Field line in FIGS. 5a-5b refers to the various fields, and in the relevant cases, their bit length is recited. The Value line refers to the bit values that should be accommodated in the field or an 'X' value designating an arbitrary bit value ("don't-care"). The values of the data phase are referenced 'CSP' to denote the coding of the data-phase as a sequence of pulses with varying durations, as will be explained further below.

The frames 50, 52 complies with both typical standard and extended start of frame and arbitration segments.

The difference between frame 50 of FIG. 5a and frame 52 of FIG. 5b is that frame 50 represents the case of a standard frame structure and frame 52 shows the extended PID frame structure (PID—packet identifier).

A pre-defined reserved bit (named "r0" in CAN-protocol) may be used for protocol type selection. In FIG. 5a, the pre-defined reserved bit is named "CSPF/XLF". Protocols which comply with the CAN-FD standard expect this bit to be in a "0" (dominant) state. Once this bit is set to "1" (recessive), CAN-FD protocol controllers release their interest in the frame and wait for the EOF and IFS, signifying the end of the CAN-derivative frame.

Frames 50, 52 may be used by other, newly defined protocols (some of which are not currently considered public) such as CAN-XL. This may cause a collision between CAN-XL message and the novel message structure of embodiments of the invention. Thus, according to other embodiment of the invention, frames 50, 52 may be configured to use the reserved bit succeeding the XLF bit instead of the XLF bit (not shown).

The CSPF/XLF bit (or CSPF bit shown in FIG. 5b) may be followed by reserved bits for further, future expansion. In the non-limiting example of FIGS. 5a-5b, two reserved bits are defined.

The reserved bits may be followed by 5 data-length bits denoting the data-payload length. This number is defined to allow larger packet sizes than 64 bytes. The mapping between the DLC value and the actual data length may vary. The actual amount of bit allocated for DLC may vary as well according to operational needs, allowing for better granularity and larger payloads management.

Various factors may be considered in setting the specific frame structure, as illustrated in the following examples:

Example (1)—basic definition example: for a DLC=0, the data phase shall contain 64 level-value transitions, and for DLC=1, the data-phase shall contain 128 level-transitions, and for DLC=31, the data-phase shall contain 2048 level-transitions.

In general, the number of level-transitions in the data-phase may comply with the following Equation 1 for $N_{LT}$:

$$N_{LT}=N_{level\text{-}transitions}=(DLC+1)\cdot 64 \qquad \text{Equation 1}$$

In example (1), zero data frames are not allowed.

Example (2)—$N_{LT}$ may be extended by certain amount of level transitions $K_{crc}$ to facilitate frame CRC field. The value for $K_{crc}$ may be determined according to the modulation parameters (including symbol lengths) and CRC length.

Example (3)—$N_{LT}$ may be extended by certain amount of level transitions $K_{meta}$ to facilitate contextual metadata for protocol control, such as ethernet addressing, protocol types, data filtering information, message authentication code and more. These information fields may be located at the start of the data-phase, but it can be embedded at other location along the data-phase as well. In addition, these information fields may be used for contextual message filtering, in addition to the standard PID based message filtering as in the CAN standard.

Example (4)—$N_{LT}$ may be extended by certain amount of level transitions $K_{preamble}$ to facilitate a calibration and parameter refinement phase during the data-phase. This preamble sequence may contain either concentrated or distributed pilot level-transitions along the data-phase.

Example (5)—$N_{LT}$ may be extended by a certain amount of level transition $K_{FEC}$ to facilitate forward error correction codes embedded by the transmitter and used by the receiver to correct possible data errors during the data transport. The actual type of code (Error correction code) may vary (e.g. Hamming, Reed-Solomon, Convolutional etc.), thus its contribution to the level-transitions count may vary as well. During validation in the receiver side, number of errors detected and corrected may be recorded in order to use this information for QoS (Quality of Service) purposes (e.g. physical layer debugging, interferences detection, parameters adjustments etc.). This information may be used also to mitigate tampering attempts and cyber-attacks of the data-bus in which the signal is degraded due to the incorporation of an additional hardware connected to the bus.

According to embodiments of the invention, additional control-to-data and data-to-ACK delimiter bits may be used. This is illustrated in FIG. 6. As shown, delimiter bits may be added between the control field and data-phase and between the data-phase to ack bit. This exemplary delimiter may be transmitted with either the low data-rate or the high data-rate. This delimiter ensures that the data phase starts with a falling edge (for synchronization) and end with a recessive logic level—delimiting the data-phase from the ack field.

The rest of the frame (namely, ACK, ACK Delimiter, EOF and IFS) shall operate as defined in CAN and CAN-FD specifications.

During the whole period of transmission, Error-frames are supported and detected by the transmitter and receivers in accordance to the specifications of CAN and CAN-FD.

To allow the usage of CAN and CAN-FD protocols whenever needed (transmission and reception), the CSPF/XLF bit remains dominant, causing standard CAN and CAN-FD frame generation.

Message filtering may be implemented by message filtering mechanisms as described in the CAN and CAN-FD specifications.

Additional data-phase filtering mechanisms may be facilitated to allow context dependent data transmission and reception. This may be particularly important when high amount of traffic is generated on busses integrating the methods and systems of the invention. For example, when a low-performance MCU (micro-controller) or time-critical process is connected to the bus, it shall filter out incoming information with not particular importance to it. In such case, the amount of computation required in high layers may be reduced significantly. In another example, ethernet and IP frame fields may be integrated during the data-phase, such as MAC address, protocol type etc.

The disclosed method may have an optional capability to support frame and source authentication. The authentication scheme shall support industry standard MAC (message authentication code) methods or other proprietary method. The message authentication may be used to mitigate cyber-hazards such as data-tampering, impersonation, replay attacks, repudiation, data source detection etc.

The disclosed method may have the capability to encrypt the transmitted traffic and decrypt it in the receiver side. Though the encryption and decryption may occur in high (application) layers, it may be beneficial to perform it in the MAC level.

As mentioned before, according to an aspect of the invention, the data-phase of the CAN frame is coded as a sequence of pulses, modulated with varying durations. The durations are the result of deviating a known cyclic signal waveform's level transition points by a series of delays $\{d_0, d_1, d_2, \ldots, d_{N-1}\}$, that correspond to the sequence of data symbols $\{s_0, s_1, \ldots, s_{N-1}\}$ to be transmitted.

The data phase may be composed of a desired number of level-transitions (denoted herein as NIT logical value transitions) of a basic, non-modulated signal.

FIG. 7 shows an example frame 70 and a non-modulated data-phase signal 72. The non-modulated signal 72 is characterized by $T_{PNeg}$—the nominal duration of '0' bit, $T_{PPos}$—the nominal duration of '1' bit, and $T_P$—the average duration of a bit within the sequence, which is the combination of $T_{PNeg}$ and $T_{PPos}$.

The transition rate in the data-phase can be controlled using parameters such as conventional CAN-style bit-timing (a.k.a. $T_q$, $N_{Prop}$, $N_{ph1}$, $N_{ph2}$) or in other methods such as:

(1) Clock pre-scalar value ($N_{PS}$) and an optional offset value ($N_{offs}$) defining the data-phase transition frequency and the ratio between $T_{PNeg}$ and $T_{PPos}$ (as described in FIG. 7).

(2) Automatic frequency and offset detection and calibration according to a predefined segment with zero modulation (preamble phase). An exemplary calibration segment is described below.

The modulation is performed by adjusting the level transition location and delaying them according to the "to-be-transmitted" symbols.

Certain factors may be considered of the modulation model parameters in setting the data-phase signal:

$f_{clock}$ denotes a system clock frequency serving the modulator and the demodulator;

G denotes a delay unit granularity in $$\frac{1}{f_{clock}}$$

units;

$L_{sym}$ denotes the length of a data symbol in bits.

R denotes a vector of modulated signal's level duration;

NPD denotes the nominal pulse duration in terms of $1/f_{clock}$. Further possibility for $NPD_{low}$ and $NPD_{high}$ for dominant and recessive pulses respectively while NPD is given by Equation 2 and is equivalent to $T_P$ in clock-cycles units:

$$NPD = \frac{NPD_{high} + NPD_{low}}{2} \quad \text{Equation 2}$$

The modulation may be formulated as follows:

A set S of N symbols to be transmitted is given: $S=\{s_0, s_1, s_2, \ldots, s_{N-1}\}$.

A sequence of pulse transition delays is calculated in terms of $1/f_{clock}$: $D=\{d_0, d_1, d_2, \ldots, d_{N-1}\}$.

It is assumed herein that all level-transitions are being modulated, but this is not necessarily so.

The modulated pulse delay sequence D is defined in Equation 3 as a function of input symbol array S:

$$d_i = G \cdot \begin{cases} \mod\left(\sum_{k=0}^{i/2} s_{2k}, 2^{L_{sym}}\right) & i \text{ is even} \\ \mod\left(\sum_{k=0}^{\lfloor i/2 \rfloor} s_{2k+1}, 2^{L_{sym}}\right) & i \text{ is odd} \end{cases} \quad \text{Equation 3}$$

For completeness we shall define $d_i=0$, $\forall i<0$

Thus the vector of durations $R=\{r_0, r_1, \ldots, r_{N-1}\}$ is defined in Equation 4 as follows:

$$r_i = \begin{cases} NPD_{lo} + d_i - d_{i-1}, & i \text{ even} \\ NPD_{hi} + d_i - d_{i-1}, & i \text{ odd} \end{cases} \quad \text{Equation 4}$$

The modulator transmits the waveform according to the above R vector along the data-phase of the frame.

Figure 8:
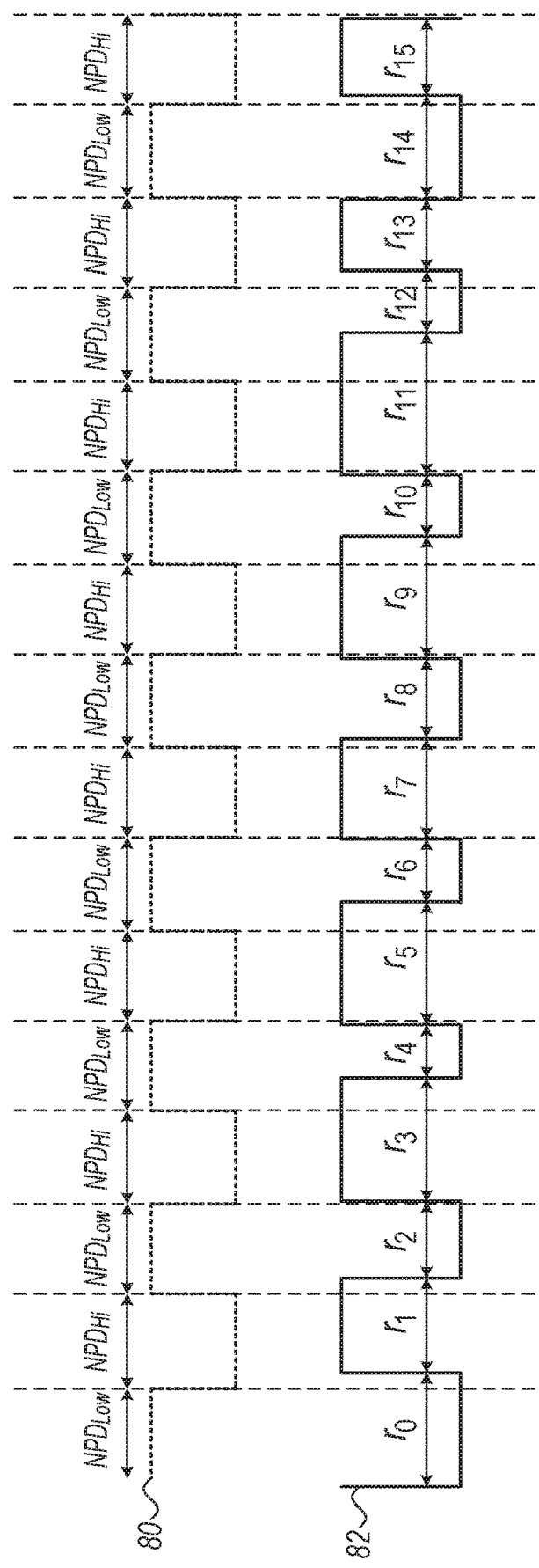
FIG. 8 is a transmission diagram illustrating an example signal that is modulated in accordance with embodiments of the invention, and an example non-modulated signal.

FIG. 8 illustrates an example signal 82 (solid line) that is modulated in accordance with embodiments of the invention, and an example non-modulated signal 80 (is dashed line).

The non-modulated signal 80 (dashed line) is characterized by nominal pulse durations $NPD_{low}$ and $NPD_{high}$ for dominant and recessive pulses respectively. The set of pulse transition delays $D=\{d_0, d_1, d_2, \ldots, d_{N-1}\}$ (not shown in FIG. 8) is calculated in accordance with Equation 3. The vector of durations $R=\{r_0, r_1, \ldots, r_{N-1}\}$ is calculated based on Equation 4. Signal 82 is generated by modulating signal 80 to reflect the vector of durations $R=\{r_0, r_1, \ldots, r_{N-1}\}$.

The delay unit granularity factor G and the length of a data symbol in bits $L_{sym}$ may be determined in accordance with the physical properties of the CAN bus. For example, the delay unit granularity G and the length of a data symbol in bits $L_{sym}$ may be determined to optimize the data rate. In order to maximize the amount of data to be communicated, a minimal delay unit granularity G value is desired, giving rise to shorter pulses to be transmitted.

The modulated pulses to be transmitted cannot be too short—as the bus would not be able to communicate such a sequence of at acceptable error rate. Thus, the physical characteristics of the CAN bus are considered in setting the desired values of the delay unit granularity factor G and the length of a data symbol in bits $L_{sym}$. By another example, the delay unit granularity G and the length of a data symbol in bits $L_{sym}$ may be determined to optimize the data rate under an acceptable bit arror rate.

According to embodiments of the invention, for specific operational requirements, the delay unit granularity G and the length of a data symbol in bits $L_{sym}$ may be predetermined for example, to address operational considerations such as noise (for example, caused by jitter), CAN bus utilization, and additional physical properties of specific communication buses.

The delay unit granularity G and the length of a data symbol in bits $L_{sym}$ may be adaptive to link quality. For example, in response to link quality indication, the modulated pulse delay sequence D (as in Equation 3) may be recalculated with different values of the delay unit granularity factor G, the length of a data symbol in bits $L_{sym}$ or both. For example, in response to bit error, the data rate may be slowed down. In the absence of error indications, the data rate may be increased.

The vector of duration R may be measured by the receiver. Vector R is indicative of the set of symbols $S=\{s_0, s_1, s_2, \ldots, s_{N-1}\}$, and thus, the receiver may reconstruct the set S of symbols out of the vector of duration R as measured.

At the receiver side, the time measurement of the pulse duration may be conducted by using a clock cycle counter, clock cycle counter with a reset value, analog time duration measurement, time-to-digital converter (TDC) or another time measurement method.

The demodulator measures the duration value vector $\hat{R}=\{\hat{r}_0, \hat{r}_1, \ldots, \hat{r}_{N-1}\}$, and computes the pairwise summation of the durations and modulo operation as in Equation 5 follows:

$$\hat{s}_i = \frac{1}{G} \cdot \mod(\hat{r}_i + \hat{r}_{i-1}, \overrightarrow{NPD}) = \quad \text{Equation 5}$$

$$\frac{1}{G} \cdot \mod(NPD_{lo} + d_i - d_{i-1} + NPD_{hi} + d_{i-1} - d_{i-2}, \overrightarrow{NPD}) =$$

$$\frac{1}{G} \cdot \mod(NPD + d_i - d_{i-2}, \overrightarrow{NPD}) \cong$$

$$[\overrightarrow{NPD} \cong NPD] \cong \frac{1}{G} \cdot (d_i - d_{i-2}) =$$

$$\begin{cases} \mod\left(\sum_{k=0}^{i/2} s_{2k}, 2^{L_{sym}}\right) - \mod\left(\sum_{k=0}^{(i-2)/2} s_{2k}, 2^{L_{sym}}\right) & i \text{ is even} \\ \mod\left(\sum_{k=0}^{\lfloor i/2 \rfloor} s_{2k+1}, 2^{L_{sym}}\right) - \mod\left(\sum_{k=0}^{\lfloor (i-2)/2 \rfloor} s_{2k+1}, 2^{L_{sym}}\right) & i \text{ is odd} \end{cases} =$$

$$\mod(s_i, 2^{L_{sym}}) = s_i$$

$\hat{s}_i$ denotes the symbol that is estimated at the receiver side, based on the measurements of the modulated signal that was transmitted by the transmitter.

$\overrightarrow{NPD}$ stands for half the nominal cycle length (cycle length—the duration between the rising to rising or the falling to falling edges) in terms of $1/f_{clock}$.

Equation 5 includes the estimation that the $\overrightarrow{NPD}$—half the nominal cycle length in terms of $1/f_{clock}$ as perceived at the receiving side, is identical or very close to the actual transmitted NPD value (the nominal pulse duration in terms of $1/f_{clock}$). This assumption is based on the fact that the NPD variance mainly depends on the clock drift differences between the transmitter nodes and the receivers. For some operational scenarios, this assumption is true. For other operational scenarios a calibration operation may be added. For example, pilot symbols may be implanted by the transmitter in the sequence of pulses to be transmitted. The receiver side may use the pilot symbols to improve the ratio $[\overrightarrow{NPD} \cong NPD]$.

The series of delays $\{d_0, d_1, d_2, \ldots, d_{N-1}\}$ is calculated (as in Equation 3) and decoded (as in Equation 5) by applying different modulation calculations for odd and even elements. As explained, practical CAN networks exhibit inherent asymmetry. The application of different calculations for odd and even elements is aimed at addressing the inherent asymmetry.

According to embodiments of the invention, the demodulator may be configured to measure the durations between consecutive level-transitions of the same type (falling to falling or rising to rising). In this manner, the receiver measured values are physical bit-asymmetry invariant.

According to embodiments of the invention, the demodulator may perform the measurement operation with a reset counter: a maximal value for the counter may be defined and each time this value is reached, the counter resets its value to '0'.

The maximal value for the reset counter may be defined as $\overrightarrow{NPD}$—half the nominal cycle length in terms of $1/f_{clock}$ as perceived at the receiving side. In such a case, the execution of the modulo operation at the receiver side may be obviated.

The demodulator may perform the measurement operation with hybrid counting logic consisting of full clock measurement augmented by a partial clocks counter for better granularity and resolution of measurement. The partial clock counter may use high speed clock source, a PLL, a time-digital-converter, an analog time measurement circuit or any other method supporting high resolution time measurements.

According to embodiments of the invention, the value $\hat{s}_i$ may be passed through a maximum-likelihood estimator after performing the pairwise summation:

$$\frac{1}{G} \cdot \mod(\hat{r}_i + \hat{r}_{i-1}, \overrightarrow{NPD}).$$

According to embodiments of the invention, the modulator and demodulator may scramble the symbols and descramble them. This may be useful to ensure a uniform distribution of pulse durations. Scrambling and descrambling may be performed by XORing the information with the output of an LFSR pseudo-random sequence which is known to both the transmitting and receiving nodes. The implementations for such scrambler and descrambler logic may follow known techniques.

The transmitter may encode the transmitter data using gray coding to minimize Bit-Error-Rates. In the case gray coding is used, the receiver party shall contain a gray decoder. The usage of gray coding in digital communication is well established in the industry, and the invention is not limited by the manner of gray coding implementation.

The transmitter may encode the transmitted data using a forward error correction (FEC) coding. If forward error correction (FEC) coding is used, the receiver must decode the incoming symbols and correct them. These FEC coding may include an interleaver (in the transmitting side) and de-interleaver (in the receiving side) to optimize some error correction codes' (ECC) performance in cases of block errors and erasures. Known ECC and interleaving methods can be used, and the invention is not limited by the actual ECC and interleaving methods to be used.

The outputs from the above described ECC block may be used to calculate a measure for Quality of Service. This may be specifically useful for debugging, diagnosing and validating network architecture, and communication system health.

Multiple Data Segments Exchange as a Single Data Frame

According to a second aspect of the invention, embodiments of the present invention provide communication systems and methods for exchanging multiple data segments as a single data frame among a plurality of communication nodes over a Controller Area Network (CAN) communication bus.

Figure 9:
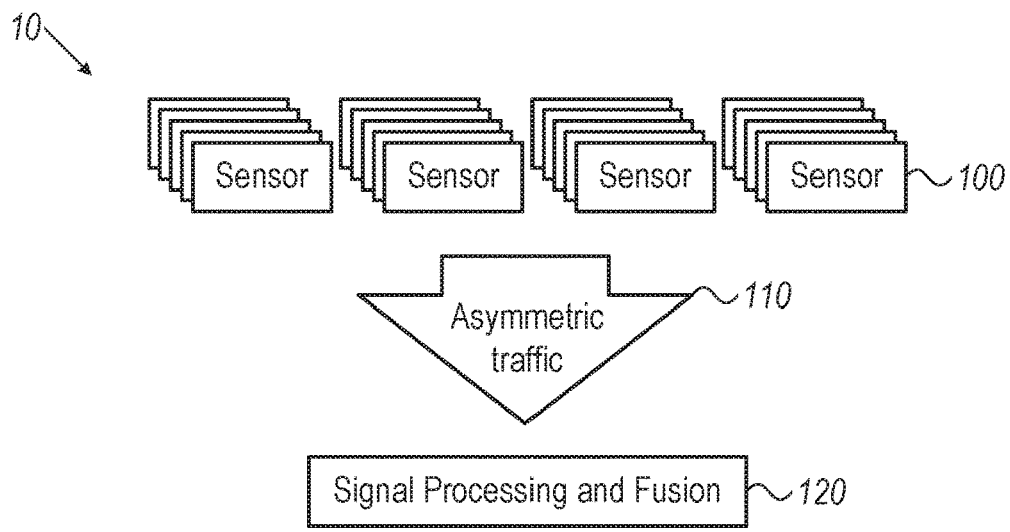
FIG. 9 is a schematic functional illustration of an exemplary prior-art communication system.

FIG. 9 is a schematic functional illustration of an exemplary prior-art communication system 10. Communication system 10 comprises multiple communication nodes, shown in FIG. 9 as sensors 100. Communication system 10 may, for example, represents a vehicular communication system, industrial communication systems, and many other systems in other fields. In practice, the communication system 10 oftentimes is structured as a CAN-derivative network with an asymmetric topology and an asymmetric traffic pattern, represented in FIG. 9 as asymmetric traffic function 110. The information coming from the sensors 100 is processed by other system elements at corresponding communication nodes, represented in FIG. 9 as Signal Processing and Fusion function 120.

Figure 10:
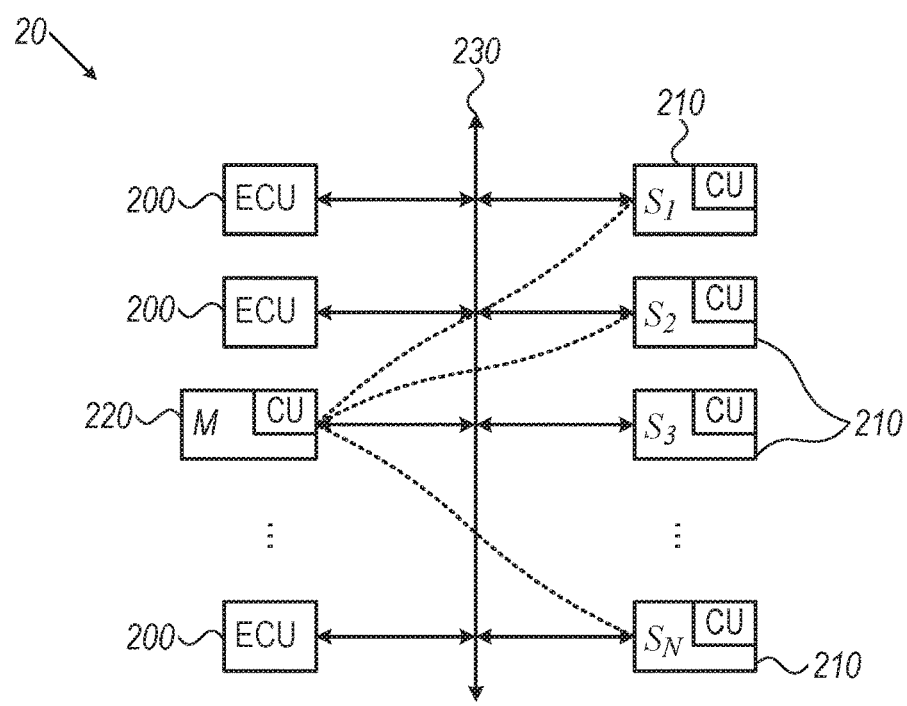
FIG. 10 is a functional illustration of a CAN-derivative communication system according to embodiments of the invention.

FIG. 10 is a functional illustration of a CAN-derivative communication system 20 according to embodiments of the invention. Three types of communication nodes are shown: general-purpose Electronic Control Units (ECUs) 200, sensor nodes S1, . . . Sn 210 (or any other DGN—data-generating node) and a master ECU M 220 for data processing and fusion that samples the sensor ECUs 210.

For example, in the automotive industry, the ECUs 210 are hardware/software or firmware components that support advanced functionalities such as higher efficiency, smart and data-driven control, and better safety, ease of use, and driving experience for the drivers passengers. Each ECU 200, 210, 220 connects with the other ECUs through the common CAN bus (or CAN-derivative) wiring 230. The invention is not limited by the structure of the communication network and the type of communication nodes.

Part or all of the ECUs 200, 210, 220 comprises a controller unit CU according to embodiments of the invention, for example, as shown in FIGS. 1a-1c, 2a-2c.

Oftentimes, vehicular sensors (such as sensors 210 in FIG. 10) are required to frequently share small packets of data, for example, sensor status data, synchronous sensors' readings, audio samples, ultrasonic sensors, diagnostic information, and more. In such cases, prior art communication systems (such as system 10 in FIG. 9) suffer from limited ability to efficiently stream the small packets of information from multiple sources in a concurrent and synchronous manner.

CAN systems are hardly adapted to repetitive small-sized payload transmissions due to the protocol overheads induces by the arbitrations, control, data-checking, and acknowledgment frame segments. In the exchange of small payloads, the bus occupancy is dedicated to flow-control and arbitration rather than actual data streaming tasks. Thus, the ability of prior-art communication systems to stream real-time isochronous signals is limited. As a result, prior art communication systems' full potential is not exploited optimally.

For this reason, vehicular sensors are sometimes arranged to communicate over a Local Interconnect Network (LIN). LIN is a broadcast serial network comprising 16 nodes (one master and typically up to 15 data-generating nodes). The master initiates all messages to be communicated in a specific LIN system with at most one data-generating node replying to a given message identifier. The master node can also act as a data-generating node by responding to its own messages.

LIN protocol allows synchronous readings of sensors and actuators' data, but its maximal allowable data-rate prevents it from facilitating high-throughput information such as audio, radar, and fast control loop data.

High-layer protocols such as TTCAN (time-triggered CAN) protocol may solve the synchronization issues, but the effective throughput problem remains.

FlexRay communication systems and MOST (Media Oriented Systems Transport) communication systems provide high effective data-rate but are optimized for large packet streaming similarly to CAN-derivative protocols, thus lack sample-level isochronous transmission capabilities.

Pulse-width modulation (PWM) and analog signaling of various automotive sensors are well established in the market, but they require point-to-point wiring. In addition, analog signaling is prone to emission disturbances and lacks robustness in the automotive environment.

Figure 11A:
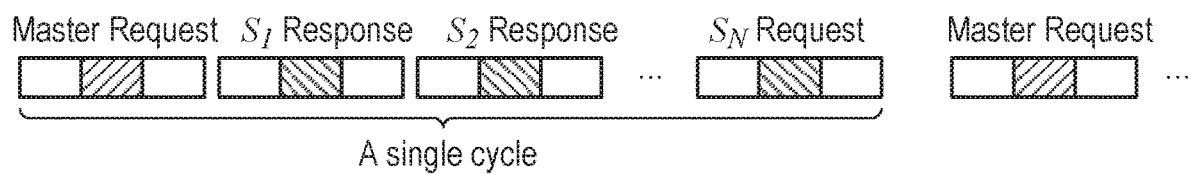
FIG. 11a schematically illustrates a cycle time of reading multiple sensors by a single master device over prior art vehicular communication networks.

FIG. 11a schematically illustrates a cycle time of reading multiple sensors S1, . . . , SN by a single master device over the CAN communication network or other prior art vehicular communication networks. The effective cycle time (the period for all the existing sensors to be read) is long due to the repetition of the flow-control segments of each message. This limitation negatively affects the latency, synchronization, the maximal data-rate, and minimal cycle time of the system and degrades the overall bus occupancy and service quality.

Figure 11B:
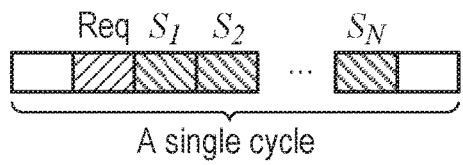
FIG. 11b schematically illustrates a cycle time of reading multiple sensors by a single master device over communication networks according to embodiments of the invention.

In comparison to FIG. 11a, the cycle time of a communication system according to embodiments of the invention, for example, such as the system illustrated in FIG. 10, is schematically illustrated in FIG. 11b. A group of sensors shares a single data frame for communicating their information. Under the control of a master node, each sensor transmits its reading during the multiple access data-phase. Efficiency is thus achieved by communicating the same sensor information while avoiding the overhead required to communicate multiple, separate CAN frames.

Typically in CAN-derivative protocols, the Data Field of a CAN-derivative frame is structured as a single-access phase. If more than a single communication node is accessing the data phase, the transmitted data may be corrupted and an error frame is triggered. According to embodiments of the invention, the Data Field of the frame is structured such that, along the data-phase, the multiple communication nodes accessing the single frame may take control of the bus and transmit their payloads of information without interrupting the normal bus operation. This collaborative formation of frame can create a fully compliant CAN and CAN-FD frame of the bus, such that may be read by a legacy CAN-FD receiver.

To access the data phase of a single frame, the respective communication nodes are assigned together. According to the embodiment of the invention illustrated in FIG. 10, type S communication nodes (sensors or other data-generating nodes) are assigned with controller unit M. The controller unit M may request the assigned communication nodes to provide data, control the transmission of the sensor data over the CAN bus, and arrange portions of the sensor data received from the plurality of communication nodes as sequential segments of the Data Field of the data frame.

According to other embodiments of the invention, multiple communication nodes (referred to herein as sensors or DGNs—Data-generating nodes) are assigned together to form a group of data-generating nodes (sensors). A predetermined one of the sensors functions as the controller of the multiple-axccess communication, as will be explained herein.

The controller unit 30, 32, 34, or 36 is to process data to be transmitted over a CAN-derivative network such as CAN, CAN-FD, CAN-XL, and other CAN-derivative protocols.

To comply with the relevant CAN-derivative protocols and co-exist with them on the same communication bus, the message frame structure 40 according to embodiments of the invention is based on the logic structure of the CAN-derivative protocols. Specifically, the bit-sequence and state-machine described in the CAN-derivative protocol standards are used.

A Start-of-Frame bit;
an Arbitration Field—either the standard 11-bit or the extended 29-bit. The Arbitration Field may be used in the manner described in the CAN and CAN-FD protocol standards.
a Control Field;
a Data Field;
a CRC Field;
an Acknowledge Field; and
an End-Of-Frame Field.

Further, the communication session of the data frame is open for a period of time that complies with a frame structure of CAN, CAN-FD, CAN-XL and other CAN-based and CAN-derivative protocols, and ethernet.

Figure 12:
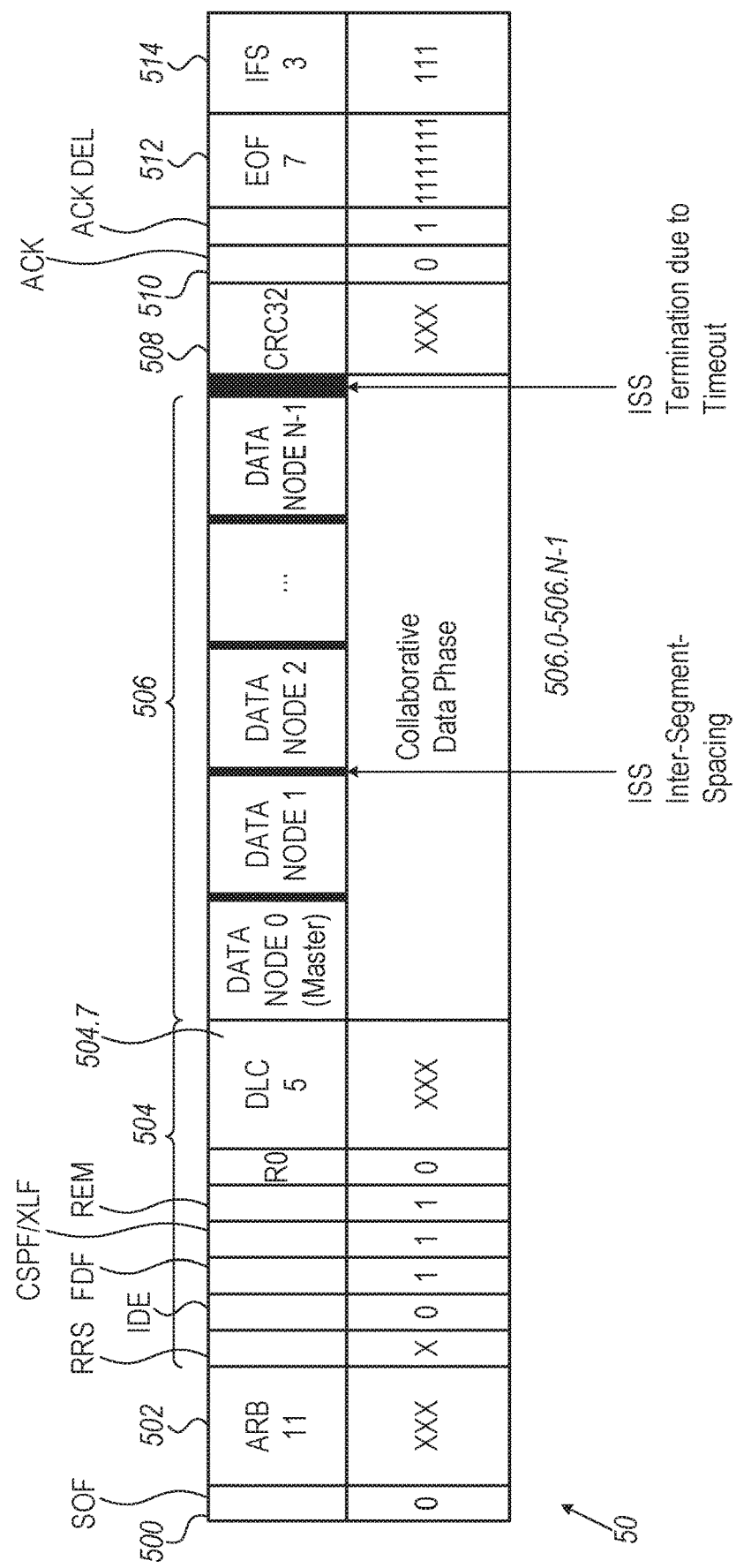
FIG. 12 shows an exemplary CAN-derivative frame structure according to embodiments of the invention.

FIG. 12 shows an exemplary CAN-derivative frame structure 50 according to embodiments of the invention.

The frame structure 50 starts with a Start-of-Frame bit SOF 500.

According to embodiments of the invention, the Arbitration Field ARB 502 may be structured as described in the CAN protocol and CAN-FD protocol. The arbitration segment may allow standard (basic) 11-bit arbitration or extended 29-bit arbitration.

According to embodiments of the invention, the Arbitration Field ARB 502 is followed by Control Field 504. The control bits such as the FDF, REM, R0, R1 may remain as described in the CAN protocol and CAN-FD protocol. Alternatively, the control bits may be modified to introduce a new type of protocol by re-assigning the purpose of R1 as a switching mechanism between the CAN-FD protocol and the novel proposed protocol.

According to other embodiments of the invention, Control Field 504 may be structured with particular modifications comparing typical CAN-derivative protocols to improve the overall protocol efficiency, preserve error detection, and maintain bus-wide data consistency. For example, The Data Length Control field DLC 504.7 may be structured to have a better granularity in data-phase length definition.

According to embodiments of the invention, Data Field 506 is structured as multiple data segments 506.0 to 506.N−1, and spacing intervals ISS to facilitate the access by multiple communication nodes [0,N−1]. Along the data-phase, the various data-generating nodes O-N−1 accessing the single frame may take control of the bus and transmit their payloads of information without interrupting the regular bus operation, as will be described herein.

According to embodiments of the invention, Check Field CRC 508, Acknowledgement Field AKN 510, End of Frame Field EOF 512, and IFS 514 may be structured as described in the CAN protocol and CAN-FD protocol.

The communication session of the data frame may be terminated as the frame exceeds the defined data-length during the control field, or arbitrarily by the master, one or more of the assigned DGNs, or by a timeout mechanism, or a combination thereof.

The arbitration and the EOF fields of the frame (not shown) are controlled by a bus master (for example, element M shown in FIG. 10). The time intervals ISS in the Data Field 506 may be defined dynamically for each frame or globally pre-determined according to the CAN-bus bit-timing characteristics.

The bus master M receives the data that is communicated by the DGNs and arrange portions of this data as sequential segments of the data field 506 of the data frame 50.

According to an embodiment of the invention, each of the communication nodes 0-N−1 participating in the network is assigned a unique identification number. Optionally, these identifications may be a list of ordered numbers (e.g., ID∈{1, 2, 3, . . . , N}).

The data-phase 506 may start with the master's request packet. The request packet may be structured as a source list from which the information is requested. The list may be given as a bit-field of source identifications (e.g. a 32-bit field may identify up to 32 assigned nodes). An Exemplary list may be: SourceIdList=(2, 4, 5, 6, 7), for which the master requests information from the assigned nodes identified by 2, 3, 5, 6, and 7. The list may be sorted in ascending, descending or arbitrary order.

The master request packet may further be structured as a request for data type information from data sources—signaling the assigned communication nodes to transmit specific information types.

Alternatively, the data-phase 506 may contain no directives by the master side, and a pre-determined sequence of transmissions by the DGNs. In this case, the system architect pre-defines the sequences of information to be transmitted by the DGNs to the master and assigns the rules of operation to the master side and participating DGN units. This configuration may be administered to the nodes by software settings, hardware settings such as GPIO coding etc.

The master request packet may be structured as configuration parameters for the various sources—optionally defining or modifying the network participants' configuration.

The various data-phase segments 506.0-506.N−1 are inter-separated by the inter-segment-spacing ISS period. The spacing intervals may be chosen to exceed the maximal bus propagation round-trip period.

During the ISS period, the bus is released for at least a defined period $T_{ISS}$, in which, the bus remains in the recessive state. The ISS interval is intended for: (1) guarding the bus against collisions caused by signal round-trip travel over the physical layer when multiple access occurs, and (2) the insertion of evident delimiters between the various bus accesses to simplify flow control.

An exemplary period for ISS may be set as outlined in Equation 6:

$$T_{ISS}=T_{PROP}=t_{tx,max}+t_{rx,max}+2 \cdot D_{max} \cdot V_{propagation} \quad \text{[Equation 6]}$$

Where, $D_{max}$ is the maximal bus length (e.g., 100 meters; thus, the round trip is 200 meters), $V_{propagation}$ denotes the signal propagation velocity in the physical media (e.g., typically $$0.2 \frac{\text{meter}}{\text{ns}}$$

in UTP transmission lines), $t_{tx,max}$ denotes the time of propagation of the signal within the interface transceivers (at the transmitting edge), and $t_{rx,max}$ denotes the time of propagation of the signal within the interface transceiver (at the receiving edge).

The duration $T_{ISS}$ of the spacing intervals ISS is calculated based on at least (1) a length of the CAN communication bus, (2) a propagation velocity of signals in the CAN communication bus, (3) a maximal propagation velocity of signals in the DGN and the controller unit, and (4) the bus bit timing parameters.

The $T_{ISS}$ may be arbitrarily configured by the user or automatically computed and used by the controller unit for optimal throughput.

After the master's request period, it may actively release the bus by writing a recessive bit level, starting the first ISS period. Furthermore, switching to the recessive ISS period happens after completing each transaction by any party on the bus.

After the ISS period, any other unit may take control of the bus and transmit its information. If the bus remains recessive for a period above $T_{skip}$, the next normal transmitting node may be considered missing or erroneous; thus its turn is skipped. If the bus remains recessive for the period above $T_{reintegrate}$, the master node may take control over the bus and close up the data-phase.

The duration of $T_{skip}$, $T_{reintegrate}$ may be configured by the user, according to basic rules of choice for optimal functionality, such as, for instance, as outlined in Equation 7:

$$T_{reintegrate} > T_{skip} > T_{ISS}. \quad \text{[Equation 7]}$$

Figure 13:
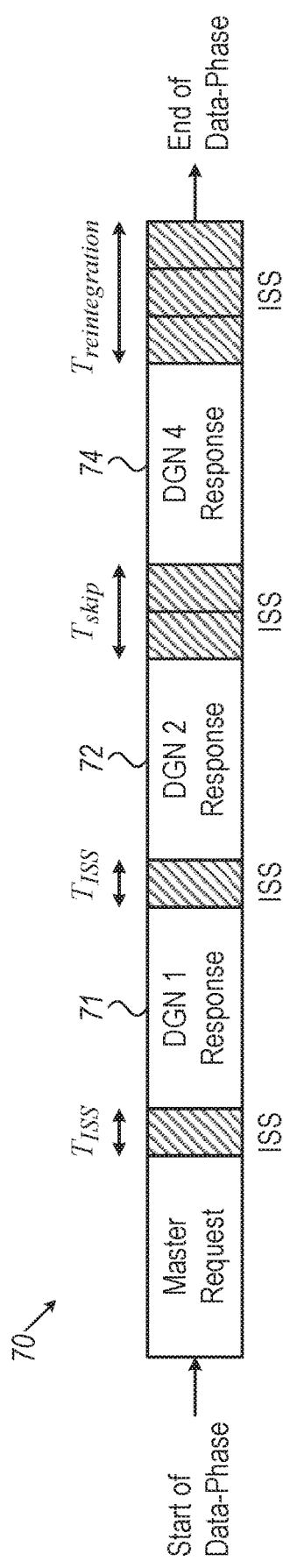
FIG. 13 shows an example data field of a frame structure according to embodiments of the invention.

FIG. 13 illustrates an example data field 70 of a frame structure according to an embodiment of the invention. For simplicity of explanation, DGNs (data-generating nodes) 0-4 are shown (the master M is designated as DGN 0). DGNs 1-4 are assigned to the master node in this non-limiting example. The data-phase segments 71-74 are composed of the respective DGN data. The data-phase segments 71-74 are inter-separated by the inter-segment-spacing ISS. A response from node 3 is missing.

For simplicity of illustration, in the example of FIG. 13, $T_{skip}$ is defined as $2 \cdot T_{ISS}$. Thus, if DGN 4 detects that DGN 3 doesn't respond to its turn for sending information (as defined by the master's requested source list), DGN 4 shall wait for DGN 3 another $T_{ISS}$ to respond, and only then it shall transmit its payload, assuming that DGN 3 didn't respond.

Generalizing the example illustrated in FIG. 13: for a given inter-segment-spacing ISS with a duration $T_{ISS}$ and $T_{skip}$, if a node i detects that node i−1 doesn't respond to its turn for sending information, node i shall wait for node i−1 another $T_{ISS}$ to respond, and only then it shall transmit its payload, assuming that node i−1 didn't respond.

In the non-limiting example illustrated in FIG. 13, $T_{reintegration}$ is defined as $3 \cdot T_{ISS}$ thus, if no node reacted during this period, the master unit shall react by closing the data-phase and reintegrating the bus by returning to the CRC and acknowledge field.

The ratio between $T_{reintegration}$ and $T_{skip}$ can be set to satisfy operational needs. For example, the ratio between $T_{reintegration}$ and $T_{skip}$ may be set to reflect the number of nodes on the bus that are assigned to multiple access on the same single data frame, that that can skip their response with a tolerable affect. For instance, in the example for FIG. 13, this number is one—only one assigned node may skip its turn for reaction during the data-phase response sequence.

In response to reading the master's request, the assigned DGNs identify themselves within the requested source list and process the request or fetch the requested information from their memory or other location such as their device list.

Sequentially, each of the DGNs (or part thereof, as designated) optionally transmits an optional synchronization dominant edge of defined length (a.k.a. a start bit); the transmitting DGN further transmits its payload over the bus. The structure of the DGN payload may be comprised of the following exemplary data-fields: Unique identification; Optional status field—indicating the nodes current configuration, status, errors and the like; The transmitted data type in the payload; The payload—the actual value or a set of values to be transmitted.

Upon completion of the data transmission by the assigned DGNs, the bus is released by the master, which puts a recessive bit on the bus. In response, the bus goes into an ISS state.

According to embodiments of the invention, the DGNs are configured to follow the following transmission rules: each node waits for at least the duration of $T_{ISS}$ before commencing its transaction; before starting the transaction, each node shall make sure the bus is in the recessive state. The DGN ordered i in the source list shall wait for the DGN ordered i−1 in the source list to finish its transaction unless a predefined period elapses—$T_{skip}$. If the i'th DGN waits for $T_{skip}$ for the starting point of the (i−1)'th node and the bus remains recessive (released), it may stop waiting and start its transaction.

According to embodiments of the invention, the communication nodes are configured for error detection and confinement. During the frame transmission on the bus, each node participating in the communication as a receiver of data or a transmitter of data may perform CRC calculations (Cyclic Redundancy Check). The CRC may be calculated over a portion of the frame or for the portions of each packet transmitted by each DGN. The master node may conclude the total frame transmission by computing the CRC of the whole frame including all its segments and packets. Error signalling policy may be configured to adapt for the application. For instance, mid-frame interruptions for error signalling may be favourable for some application but not application to others.

If CRC error is detected by any of the communication nodes participating in the frame reception, these communication nodes send a NACK (recessive) bit during the acknowledge phase. This functionality may resemble the functionality described in the CAN and CAN-FD protocols. Further, form error detection may be enabled as well by structuring the frame to include a stuffing mechanism as described in the CAN and CAN-FD protocols.

The length of the CRC, its configuration and polynomial, may vary in accordance with the safety requirements from the protocol and other operational considerations.

According to embodiments of the invention, the DGNs are constructed to form a group of associated DGNs, and a predetermined one of the associated DGNs is configured to request the plurality of associated DGNs to provide their data. The predetermined DGN may respond, over the CAN communication bus, to a Remote Frame request addressing the plurality of associated DGNs information. This remote request, is responded by the designated DGN by acting as the master node in the network, starting a CAN frame with multiple access data-phase session, controlling its parameters and finalizing it during the EOF field. The plurality of associated DGNs may be configured to respond to such a request by transmitting their DGN data. During this transaction, the frame structure of a legacy CAN, CAN-FD or CAN-XL may be strictly preserved all along the frame. The frame that will be reflected on the bus will fully comply with these legacy protocol frame structures. The formed frame structure may be readable for legacy protocol controllers participating in the bus, such that the distributed data-source payloads will be served to them in an efficient, packed format without the need to change their protocol specifications.

The predetermined DGN may be configured to transmit spacing interval signals between the multiple data segments corresponding to the multiple DGNs.

According to embodiments of the invention, the DGNs are configured to transmit the DGN data as an open collector signal. According to other embodiments of the invention, the DGNs are configured to transmit the DGN data as a push-pull signal. According to yet other embodiments, the DGNs are configured to transmit the DGN data as a mixed push-pull and open collector signal, designed to maintain the communication but in a recessive state during the spacing intervals.

Due to the variety of methods in which the DGN may transmit their data, the information on the bus may be better protected against electromagnetic interference (EMI), electromagnetic compatibility (EMC) and noise induced errors. The open-collector signalling method used by CAN protocols are prone to errors and asymmetries in the physical layer, thus, using better signalling methods such as push-pull signalling may improve the resilience of the data on the bus.

During the data-phase period, each DGN may elect to use push-pull electrical signalling method rather than the conservative open-collector method, during its packet transmission period. As the DGN finished transmitting its packet, the push-pull signalling is finished and the bus is idle until either another DGN transmits its information of the session is finalized. The usage of push-pull signalling simplifies the cost-constrained node architectures and improves signal integrity and signal-to-noise ratio. The use of push-pull signalling thus improves the communication speed and relaxes other system level constraints such as clock accuracy requirements and costs.

Figure 14:
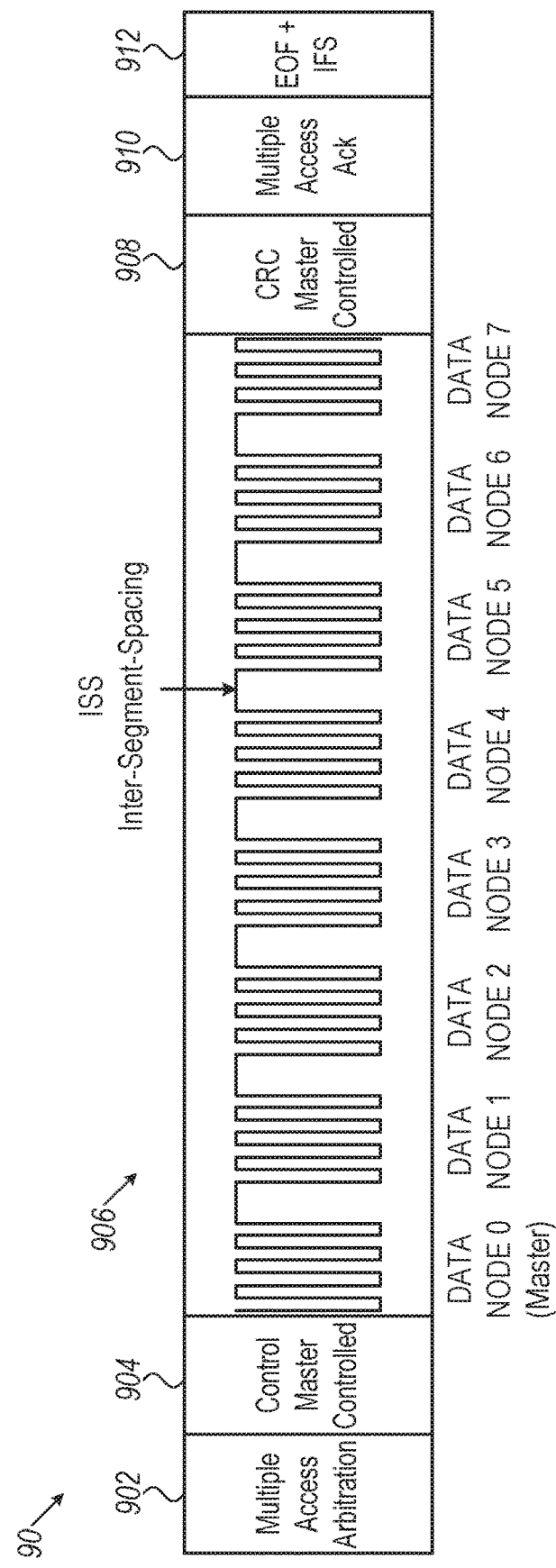
FIG. 14 shows an exemplary CAN-derivative frame structure according to additional embodiments of the invention.

FIG. 14 shows an exemplary CAN-derivative frame structure 90 according to embodiments of the invention, wherein a group of DGNs generate data that is communicated in a single frame—multiple accessed-frame—as shown, for example, in FIGS. 10 and 12; and the data field of the multiple accessed-frame is coded for high bandwidth communication, as shown, for example, in FIG. 8.

According to an embodiment of the invention, the bus master (element 220 in FIG. 10) is to code the data provided by the assigned DGNs by modulating a sequence of DGN data pulses with varying durations (as explained for example with reference to Equations 3, 4 and 5), as well as controls the multiple access configuration, for example as explained with reference to FIG. 12.

The frame structure 90 starts with a Start-of-Frame bit SOF (not shown).

According to embodiments of the invention, the Arbitration Field 902 may be structured as described in the CAN protocol and CAN-FD protocol. The multiple access arbitration is implemented, for example, by signalling the DGNs to code their information using the high bandwidth method. The signaling may be facilitated, for example, by introducing yet another branch in the reserved bits sequence.

The Arbitration Field 902 is followed by Control Field 904. The Control Field 904 may be controlled by the master. If control field is needed, it is "written" on the bus by the master—not the DGNs. The DGNs "write" on the bus during the data-field and do not have access during the arbitration and control fields of the frame.

Data Field 906: The master node may further perform a bus-burst operation in which the bus utilization is shared between the collaborative and non-collaborative modes. During the non-collaborative mode, the bus participants may comply with CAN-derivative specifications, send and receive messages as described in various legacy protocols and implementations with PID, CONTROL, DATA and ACK fields. In the collaborative mode, the master node opens a burst session in which the data-phase is not strictly time constrained. During this data-phase, the various DGNs may write their data payload in a sequential way or comply with various techniques to arbitrate the bus usage, such as the techniques incorporated in IEEE-802.3. This collaborative mode session may be finalized by the master side to return to the non-collaborative mode.

The data field 906 is followed by CRC Field 908, that is controlled by the master DGN.

The CRC Field 908, is followed by Acknowledgment field Ack 910. The acknowledge bit multiple access operation may fully resemble the requirements and specifications of the CAN and CAN-FD protocols.

Frame 90 ends with EOF+IFS field 912, As described in CAN and CAN-FD protocol specifications.

Specific embodiments of the invention may be useful for a variety of applications, for example, in the automotive market, that need efficient readings of sensors, actuators, and streamed signals with minimal bus time utilizations, isochronous and synchronous operation, and minimal latency. Examples of such applications are automotive sensor (ultrasonic, radar, etc.) information gathering; Industrial sensor information gathering; automotive audio applications (active noise cancellation, road noise cancellation, eCall, etc.); automotive persistent diagnostic service over CAN; and navigation and localization information for fusion and SLAM (Simultaneous Localization and Mapping) and self-driving. The invention is not limited by the specific implementation and application that are described herein.

Sensor sampling and conditioning system-on-a-chip (SOC)—the vehicular network may contain various types of sensors, some of which may have the capability to transmit their information over the CAN network. To reduce cost, a system on a chip may be constructed in accordance to embodiments of the invention, and all the additional logic for sampling, interfacing, filtering, and conditioning such samples before sending them over the network. One example of such system on a chip may be used for vehicular ultrasonic sensors. These sensors are short-range radar-type devices and are typically used in vehicles as surround collision prevention sensors.

Inertial and navigation sensors sampling for SLAM (Simultaneous Localization and Mapping) navigation. The following sensors may be used together with other components: GPS, accelerometers, gyroscopes, magnetometers, inclinometers, barometers, optic flow sensors, traffic sign recognition, and localization sensors. All these examples may produce a high rate of information with small payload sizes.

Audio acquisition on device and pre-processing before sending—In this variant, the disclosed method is used to transmit audio information in real-time and sample-level. Most prior art CAN-networks may struggle to communicate audio samples in real-time without buffering the information first. According to embodiments of the invention, audio samples may be sent by several concurrent audio sources to be later digested by a digital signal processor. One of such application is ANC (active noise control and cancellation) or RNC (road-noise cancellation), in which sample-level information needs to be received by a DSP (digital signal processor) from many different microphone devices concurrently.

Embodiments of the invention may be used for periodic diagnostic information delivery to a master gateway ECU in a vehicle. In such a case, a diagnostic service running in the gateway shall be scheduled to request information (sensor readings, error list, operational status, etc.) from its assigned data-generating nodes (for example, other ECUs on the network). This information may be recorded, analyzed, or delivered to a remote server to gain insights for problem diagnostics, preventive and predictive maintenance, usage statistics, and anomaly detection.

In an optional implementation form of the first and/or second of the invention, one or more pilot signal transmitted by the transmitting node (transmitter) are used for calibrating the modulation between the transmitter and the receiving node (receiver). The transmitter may apply one or more encoding settings which the receiver must be familiar with in order to correctly demodulate and decode the modulated signal. The pilot signals may be used to transfer theses encoding settings to the receiver.

The pilot signal(s) may include calibration information that may be used by the receiver to calibrate and adjust according to one or more encoding setting applied by the transmitter. The calibration information may includes, for example, the duration and/or the maximum number of delay time units. The receiver may use the calibration information to calibrate and adjust itself to synchronize with the operation mode of the transmitter.

Using the pilot message signals may further allow dynamically adjusting the encoding setting(s) in real-time and using the pilot signal(s) to update the decoder about the adjusted encoding setting(s).

Although the embodiments described herein mainly address CAN communication in the automotive field, the methods and systems exemplified by these embodiments can also be applied to CAN communication in other fields, for example, aviation, maritime systems, industrial control systems, home automation, smart buildings, medical devices, trains, city automation systems and others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A communication system for coding and communicating data frames for high bandwidth communication over a Controller Area Network (CAN) communication bus, each data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and a controller unit of the transmitting node is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

2. The communication system of claim 1 wherein the series of delays further depends on a delay unit granularity factor G and a length of a data symbol $L_{sym}$ in bits and wherein the delay unit granularity factor G and a length of a data symbol in bits $L_{sym}$ are selected to optimize data rate, bit error rate, or maximal data rate under acceptable bit error rate.

3. The communication system of claim 2 wherein, in response to link quality indication, the controller unit is to recalculate the series of delays with different values of at least one of the delay unit granularity factor G and the length of a data symbol in bits $L_{sym}$.

4. The communication system of claim 1 wherein the number of level transitions in the Data Field is determined as a function of DLC data length code and is optionally extended to constitute one or more information fields from a group consisting of: the sequence of data symbols to be transmitted; CRC length; contextual metadata for protocol control; calibration pilot level-transitions; and forward error correction codes.

5. The communication system of claim 1 wherein a controller unit of the receiving node is to measure a received sequence of pulses durations, estimate therefrom the series of delays and determine the sequence of data symbols.

6. The communication system of claim 5 wherein the controller unit of the receiving node is further to measure the received sequence of pulses durations by measuring durations between consecutive, same-type level-transitions.

7. The communication system of claim 6 wherein the controller unit of the transmitting node is to transmit pilot signals containing calibration information and the controller unit of the receiving node is to calibrate measurement clock based on the calibration information.

8. A controller unit for coding and communicating data frames for high bandwidth communication over a Controller Area Network (CAN) communication bus, each data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the controller unit is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

9. A method for coding and communicating data frames for high bandwidth communication over a Controller Area Network (CAN) communication bus, each data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and at least one controller unit of the transmitting node and at least one controller unit of the receiving node, the method comprising coding and transmitting the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

10. A communication system for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN),
wherein for a controller unit and a plurality of associated data-generating nodes, one of the controller units and a predetermined DGN is to:
request the plurality of associated DGN to provide DGN data; and
control a transmission of the DGN data over the CAN communication bus by transmitting a spacing interval between the multiple data-segments;
and wherein the controller unit is to:
arrange portions of the DGN data received from the plurality of DGN as sequential segments of the Data Field of the data frame.

11. The communication system of claim 10, wherein the controller unit is further to communicate the data frame to one or more communication nodes over the CAN communication bus.

12. The communication system of claim 10 wherein a communication session of the data frame is open for a period of time that complies with a frame structure of a group consisting of CAN protocol, CAN-based protocol, CAN-FD, CAN-FD-based protocols, CAN-XL protocol, and ethernet.

13. The communication system of claim 10 wherein the controller unit is further to selectively exchange multiple data segments as the single data frame under a predefined communication session plan.

14. The communication system of claim 10 wherein the spacing interval is implemented by transmitting edge spacing modulated symbols within the Data Field.

15. The communication system of claim 10, wherein, during the spacing interval, the CAN communication bus remains in a recessive state.

16. The communication system of claim 10, wherein, after the spacing interval, if the CAN communication bus remains in a recessive state for a skip duration, the one of the controller units and a predetermined DGN is further to skip the transmission of a corresponding DGN data.

17. The communication system of claim 10, wherein, after the spacing interval, if the CAN communication bus remains in a recessive state for a reintegration duration, the one of the controller unit and a predetermined DGN is further to close the data transmission.

18. The communication system of claim 10 wherein the DGNs are to transmit the DGN data as one of a group consisting of:
open collector signal;
push-pull signal;
mixed pull-push and open collector signal, designed to maintain the communication bus in a recessive state during the spacing interval.

19. The communication system of claim 10 wherein the predetermined DGN is to transmit over the CAN communication bus a Remote Frame addressing the plurality of associated DGN, and the plurality of associated DGN are to respond by transmitting DGN data.

20. A method for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN),
wherein for a controller unit and a plurality of associated data-generating nodes, the method comprising:
requesting the plurality of associated DGN to provide DGN data; and
controlling a transmission of the DGN data over the CAN communication bus by transmitting a spacing interval between the multiple data-segments; and
arranging portions of the DGN data received from the plurality of DGN as sequential segments of the Data Field of the data frame.

21. A communication system for high bandwidth communication over a Controller Area Network (CAN) communication bus, a data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises at least one transmitting node and at least one receiving node, and a controller unit of the transmitting node is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements, and wherein, for the controller unit of the transmitting node and a plurality of associated data-generating nodes, one of the controller unit and a predetermined DGN is to request the plurality of associated DGN to provide DGN data; and control the transmission of the DGN data over the CAN bus by transmitting a spacing interval between the multiple data-segments; and wherein the controller unit is to arrange portions of the DGN data received from the plurality of DGN as sequential segments of the Data Field of the data frame.

22. A communication system for exchanging multiple data segments as a single data frame among a plurality of communication nodes over a Controller Area Network (CAN) communication bus, the data frame has a logical structure according to CAN Standard ISO 11898-1 and is composed of a sequence of bits and waveform defining a Start-Of-Frame-Bit, an Arbitration Field, a Control Field, a Data Field, a CRC Field, an Acknowledge Field and an End-Of-Frame Field, the communication system comprises controller units and data-generating nodes (DGN), wherein for a controller unit and a plurality of associated data-generating nodes, one of the controller units and a predetermined DGN is to request the plurality of associated DGN to provide DGN data; and control a transmission of the DGN data over the CAN bus by transmitting a spacing interval between the multiple data-segments; wherein the one of the controller units and a predetermined DGN is to arrange portions of the DGN data received from the plurality of DGN as sequential segments of the Data Field of the data frame, and wherein one of the controller unit and a predetermined DGN is to code and transmit the Data Field by modulating a sequence of pulses with varying durations defined by deviating a number of level transitions of a known cyclic signal waveform by a series of delays, wherein the series of delays is indicative of a sequence of data symbols to be transmitted and wherein the series of delays is calculated by applying different modulation calculations for odd and even elements.

* * * * *